United States Patent [19]

Karita et al.

[11] Patent Number: 5,781,208
[45] Date of Patent: Jul. 14, 1998

[54] SEALING MECHANISM FOR AND INK-JET RECORDING HEAD

[75] Inventors: Seiichiro Karita, Yokohama; Akio Saito, Hadano; Megumi Saito, Kawasaki, all of Japan

[73] Assignee: Canon Kabushiki Kaisha, Tokyo, Japan

[21] Appl. No.: 805,969

[22] Filed: Feb. 25, 1997

Related U.S. Application Data

[63] Continuation of Ser. No. 618,087, Mar. 19, 1996, abandoned, which is a continuation of Ser. No. 336,089, Nov. 7, 1994, abandoned, which is a continuation of Ser. No. 953,775, Sep. 30, 1992, abandoned, which is a division of Ser. No. 730,906, Jul. 31, 1991, abandoned.

[30] Foreign Application Priority Data

| Dec. 6, 1989 | [JP] | Japan | 1-318078 |
| Nov. 30, 1990 | [JP] | Japan | 2-337905 |

[51] Int. Cl.$^6$ ................................. B41J 2/165
[52] U.S. Cl. ........................... 347/29; 347/87
[58] Field of Search ............... 347/22, 29, 44, 347/86, 87, 90, 20; 428/343, 355

[56] References Cited

U.S. PATENT DOCUMENTS

| 3,482,258 | 12/1969 | Steen | 346/140 R |
| 4,306,245 | 12/1981 | Kasugayama et al. | 346/140 R |
| 4,524,104 | 6/1985 | Hagio et al. | 428/343 X |
| 4,636,546 | 1/1987 | Chao | 525/123 X |
| 4,987,186 | 1/1991 | Akiyama et al. | 525/123 X |
| 5,148,192 | 9/1992 | Izumida et al. | 346/140 R |

FOREIGN PATENT DOCUMENTS

| 0001165 | 3/1979 | European Pat. Off. . |
| 3544868 | 11/1986 | Germany . |
| 0145157 | 8/1984 | Japan . |
| 0000185 | 1/1989 | Japan . |
| 64185 | 1/1989 | Japan . |
| 1-256582 | 10/1989 | Japan . |

*Primary Examiner*—John E. Barlow, Jr.
*Attorney, Agent, or Firm*—Fitzpatrick, Cella, Harper, & Scinto

[57] ABSTRACT

A sealing mechanism for an ink-jet recording head provided with an acrylate copolymer obtained by crosslinking an acrylic copolymer with isocyanate, the acrylic copolymer being obtained by using at least 80 wt % of a total content of an alkyl acrylate having a OH group and/or an alkoxy alkyl acrylate having an OH group, and an acrylate having a side chain of an alkyl or alkoxy alkyl group having 4 to 9 carbon atoms, wherein the acrylate copolymer is substantially free of any polymer or a residual monomer having a molecular weight of 10,000 or less.

4 Claims, 17 Drawing Sheets

SEALING MECHANISM FOR AND INK-JET RECORDING HEAD

This application is a continuation of application Ser. No. 08/618,087 filed Mar. 19, 1996, now abandoned, which is a continuation of application Ser. No. 08/336,089 filed Nov. 7, 1994, now abandoned, which is a continuation of application Ser. No. 07/953,775 filed Sep. 30, 1992, now abandoned, which is a division of application Ser. No. 07/730,906 filed Jul. 31, 1991, now abandoned.

TECHNICAL FIELD

The present invention relates to an adhesive tape, an ink-jet recording head, and a storage method and, more particularly, to an ink-jet recording apparatus seal tape as a preferable application.

The present invention also relates to a recording head or an ink tank built-in recording head suitable for a printer, a copying machine, an ink-jet recording apparatus and the like generally used as office equipment, and a method of storing the recording head and, optimally, to a recording head detachably mounted in an apparatus main body.

TECHNICAL BACKGROUND

As described in Japanese Patent Laid-Open No. 59-198161, an ink-jet recording apparatus employs a method of preventing clogging during ink transport and ink injection failure by arranging a capping unit having an ink absorbing member to cover a nozzle surface. In recent years, an ink tank built-in cartridge type ink-jet head has been developed, and a method of protecting an injection port is described as in Japanese Patent Laid-Open No. 60-204348. According to this method, a cap-like protective member having an ink absorbing member is mounted on the injection port. Alternatively, as described in Japanese Patent Laid-Open No. 61-125851, a seal member using a vinylidene chloride resin as a base material is used as an injection port protective tape, thus proposing a nozzle surface protective member without using any capping unit.

In the capping unit described above, an ink may overflow during transport of a printer, and the interior of the printer may be contaminated. When a cap-like protective member is used in an ink tank cartridge type ink-jet head, the resultant printer becomes expensive. When the protective member is filled with an ink, the injection port is contaminated, thus causing clogging and injection failure. For this reason, the nozzle surface may be sealed with a seal tape. In a conventional technique using a vinylidene chloride resin as a base material, no specific description of an adhesive component is given, and a special structure in which the adhesive agent is not brought into contact with the ink at an interface with the ink is employed. Therefore it is difficult to perform positioning between the tape and the injection port.

When a commercially available seal tape is used in favor of low cost and easy handling, the following problems are posed, and the commercially available seal tape cannot be used for ink-jet printers.

Conventional adhesive agents are classified into three types of adhesive agents: (1) a rubber-based adhesive agent; (2) a silicone-based adhesive agent; and (3) an acrylic adhesive agent. The adhesive agent (1) has a high adhesion strength but contains many unsaturated groups, so that it tends to be chemically changed in properties or deteriorated. The adhesive agent (2) is rarely changed in properties and has good resistance to chemicals, but has a low adhesion strength to disable tight contact with a target adhesion object. The acrylic adhesive agent (3) is rarely changed in properties, but has a high peeling strength because it contains polyterpene resin, rosin and phenol resin as tackifiers. These resins are dissolved in a water-soluble organic solvent contained in an ink. In addition, oligomer components having relatively low polymerization degrees are contained in an acrylic resin of a general acrylic adhesive agent. These oligomer components are gradually eluted to contaminate the surface and interior of the injection port according to the findings of the present inventor.

Injection failure may occur due to contamination caused by an adhesive agent residue on the surface. In addition, when a commercially available tape is brought into contact with the ink, elution of the adhesive agent and the change of properties in ink occur, thus posing many problems.

DISCLOSURE OF THE INVENTION

It is a primary object of the present invention to provide an excellent tape to replace an adhesive tape having degraded adhesion properties and limited applications, in view of the fact that the adhesive tape is used in a variety of applications, such as in the manufacture of semiconductor devices, and as an adhesive member in daily use.

According to the present invention, there is provided an inexpensive ink-jet recording apparatus seal-tape which can solve the conventional problems described above, has good re-peel properties with respect to a nozzle surface, and does not adversely affect the ink.

According to the present invention, there is provided a storage method and a storage container, which allow long-term preservation of various types of articles, are not adversely affected by an eluent from an adhesive portion upon use of an article, and can immediately achieve an application purpose of the article.

The above object can be achieved by the present invention as follows:

(1) An adhesive tape characterized in that an adhesive component of an adhesive seal tape essentially consists of an acrylate copolymer obtained by crosslinking an acrylic copolymer with isocyanate, the acrylic copolymer being obtained by using at least 80 wt % of a total content of an alkyl acrylate having an OH group and/or an alkoxy alkyl acrylate having an OH group, and an acrylate having a side chain of an alkyl or alkoxy alkyl group having 4 to 9 carbon atoms.

(3) A recording head including an ink storage unit, an energy generation element for injecting an ink from the ink storage unit, and an ink injection portion corresponding to the energy generation element, characterized by comprising a seal member for sealing the injection portion and an ink tank outer air communication port, and a press member for urging the seal member against the injection portion, and in that an adhesive component of the seal member essentially consists of an acrylate copolymer obtained by crosslinking an acrylic copolymer with isocyanate, the acrylic copolymer being obtained by using at least 80 wt % of a total content of an alkyl acrylate having an OH group and/or an alkoxy alkyl acrylate having an OH group, and an acrylate having a side chain of an alkyl or alkoxy alkyl group having 4 to 9 carbon atoms, and the ink injection portion and the ink tank outer air communication port are sealed in a non-recording mode by the recording head.

(7) A method of storing a recording head including an opening portion which communicates with a storage unit for storing an ink and is open to outer air, characterized in that the recording head comprises a seal member simultaneously sealing an injection portion and an ink tank outer air communication port, both of which serve as the opening portion, and a press member for urging the seal member against the injection portion, the sealing member containing an adhesive component essentially consisting of an acrylate copolymer obtained by crosslinking an acrylic copolymer with isocyanate, the acrylic copolymer being obtained by using at least 80 wt % of a total content of an alkyl acrylate having an OH group and/or an alkoxy alkyl acrylate having an OH group, and an acrylate having a side chain of an alkyl or alkoxy alkyl group having 4 to 9 carbon atoms, and the recording head is stored by urging the injection portion against a peripheral portion of the seal member by the press member.

(11) An ink-jet cartridge storage container comprising a cover member and a container main body bonded to the cover member and having a recess which forms a storage space of an ink-cartridge having an injection port for injecting an ink, wherein the container main body comprises a wall portion kept separated from the ink-jet cartridge and a recess extending from the wall portion to the storage space to support the ink-jet cartridge, and the ink-jet cartridge comprises a seal member and a press member for urging the seal member against the ink-jet cartridge, the seal member containing an adhesive component for covering the injection port and an ink tank air communication port, the adhesive component essentially consisting of an acrylate copolymer obtained by crosslinking an acrylic copolymer with isocyanate, the acrylic copolymer being obtained by using at least 80 wt % of a total content of an alkyl acrylate having an OH group and/or an alkoxy alkyl acrylate having an OH group, and an acrylate having a side chain of an alkyl or alkoxy alkyl group having 4 to 9 carbon atoms.

(12) An ink-jet cartridge storage container comprising a cover member and a container main body bonded to the cover member and having a recess which forms a storage space of an ink-cartridge having an injection port for injecting an ink, wherein the container main body comprises a wall portion kept separated from the ink-jet cartridge and a recess extending from the wall portion to the storage space to support the ink-jet cartridge, and the ink-jet cartridge comprises a seal member and a cap member for covering the injection port so as to urge the seal member against the ink-jet cartridge, the seal member containing an adhesive component for covering the injection port and an ink tank air communication port, the adhesive component essentially consisting of an acrylate copolymer obtained by crosslinking an acrylic copolymer with isocyanate, the acrylic copolymer being obtained by using at least 80 wt % of a total content of an alkyl acrylate having an OH group and/or an alkoxy alkyl acrylate having an OH group, and an acrylate having a side chain of an alkyl or alkoxy alkyl group having 4 to 9 carbon atoms.

The adhesive agent according to the present invention is an acrylic adhesive agent. The acrylic resin-based adhesive agent (particularly, an adhesive agent effectively use in an ink-jet recording head) is a new adhesive agent obtained upon extensive studies so as to achieve the object of the present invention.

Examples of an acrylic monomer used in an acrylic adhesive agent are an alkyl ester monomer (e.g., methyl acrylate, ethyl acrylate, propyl acrylate, isopropyl acrylate, butyl acrylate, isobutyl acrylate, 2-methylbutyl acrylate, 2-ethylbutyl acrylate, 3-methylbutyl acrylate, 1,3-dimethylbutyl acrylate, pentyl acrylate, 3-pentyl acrylate, hexyl acrylate, 2-ethylhexyl acrylate, heptyl acrylate, 2-heptyl acrylate, octyl acrylate, 2-octyl acrylate, and nonyl acrylate) and an alkoxyl alkyl ester monomer (e.g., 2-ethoxyethyl acrylate, 3-ethoxypropyl acrylate, 2-ethoxybutyl acrylate, 3-methoxybutyl acrylate, 2-ethoxyethyl acrylate, and 3-methoxypropyl acrylate). These monomers are used together with a monomer having a hydroxyl group preferably in a total content of 50 to 100 wt % and more preferably in a total content of 50 to 80 wt %.

Examples of a multivalent isocyanate compound are tolylene diisocyanate, hexamethylene diisocyanate, diphenylmethane diisocyanate, isophorone diisocyanate, xylylene diisocyanate, bis(isocyanatomethyl)cyclohexane, dicyclohexylmethane diisocyanate, lysine diisocyanate, trimethylhexamethylene diisocyanate, tolylene diisocyanate, an adduct of hexamethylene diisocyanate, denatured urethane, denatured allophanate, denatured buret, denatured isocyanate, and a urethane prepolymer (e.g., an oligomer compound having isocyanate groups at its both terminals).

In an adhesive agent using an acrylate according to the present invention, it is preferable to adjust a cohesion to assure the prescribed performance.

The first method of adjusting the cohesion according to the present invention is to copolymerize a monomer containing a hydroxyl group and to crosslink the resultant copolymer with a multivalent isocyanate compound. Examples of the monomer containing a hydroxyl group are 2-hydroxyethylacrylate, 2-hydroxypropyloacrylate, hydroxybutylacrylate, 2-hydroxyethylmethacrylate, 2-hydroxypropylmethacrylate, hydroxybutylmethacrylate, an acrylate of a multivalent alcohol, a methacrylate of a multivalent alcohol, ethyl Carbitol acrylate, methyl triglycol acrylate, 2-hydroxyethylacryloylphosphate, and proxyethylacrylate. The monomer containing a hydroxyl group is used within the range of 5 (inclusive) to 20 (exclusive) wt % and is partially or entirely crosslinked with-the multivalent isocyanate.

The second effective method used in cohesion adjustment is to appropriately use a methacrylate monomer, vinyl acetate, styrene, acrylonitrile, acrylamide, and methacrylamide as copolymerization components. Of these materials, acrylonitrile, acrylamide, and methacrylamide are suitable for an ink-jet recording head according to the present invention and are preferably used in the range of 5 (inclusive) to 15 (exclusive) wt %.

The third effective method used in cohesion adjustment is to perform crosslinking using N-methylol acrylamide, N-methylomethacrylate, diacetone acrylamide, and butoxymethyl acrylamide. This crosslinking monomer is preferably used in the range of 5 (inclusive) to 15 (exclusive) wt %.

The second and third cohesion adjustment methods are more preferably used together with the first cohesion adjustment method.

When the side chain of the alkyl acrylate and/or alkoxy alkyl acrylate contains 90 parts by weight or more of the alkyl and/or alkoxy alkyl group having 4 carbons or less, a Tg value is undesirably large, and adhesion strength between the adhesive agent and the nozzle surface is degraded to cause ink leakage. However, when the side chain contains 90 parts by weight or more of the alkyl and/or alkoxy alkyl group having 9 carbons or more, the Tg value is decreased to increase the adhesion force. Therefore, the adhesion strength between the adhesive agent and the nozzle surface is increased to degrade the re-peeling property during use. The adhesive agent may peel from the base to contaminate the nozzle surface.

The adhesive agent according to the present invention is excellent in resistance to chemicals, i.e., an ink-jet ink and is unlikely to be subject to elution of organic substances. The adhesive agent has a low content of multivalent metals, and has physical properties excellent in protection performance of an ink-jet head surface. In order to obtain these physical properties, an adhesive agent is prepared by using the above materials.

(1) The above monomer is polymerized in ketone, ester, or an aromatic organic solvent to obtain a high polymer having a weight average molecular weight of 250,000 to 700,000. At this time, it is important that the resultant polymer does not contain any low polymer having a molecular weight of 10,000 or less and any residual monomer component. The polymerization conditions must be preferably set to eliminate low polymers upon a chemical reaction. The best method of eliminating the low polymers is to precipitate the low polymers and then dissolve them in a good solvent.

(2) The monomer is polymerized into a high polymer having a weight average molecular weight of 250,000 (inclusive) to 1,000,000 (inclusive) in accordance with an emulsion polymerization method or a soap-free emulsion polymerization method. In the emulsion polymerization method, the monomer is dissolved in a good solvent as a xylene or ethyl acetate once to eliminate nonpolymerized monomer components. In addition, low polymers having molecular weights of 10,000 or less are preferably eliminated as in the method (1). A diisocyanate having a ratio of a molarity $M_{NCO}$ Of the isocyanate group to a molarity $M_{OH}$ of the hydroxyl group in the resultant polymer, that is:

$$\frac{M_{OH}}{M_{NCO}} = \frac{1}{1.2} - \frac{1}{0.8}$$

is added to obtain a paint solution. The paint solution added with the diisocyanate is applied to a support film within the range of 5 μm to 100 μm (preferably 5 μm (inclusive) to 50 μm (inclusive)) and is heated and dried by a normal drying unit. A drying temperature falls within the range of 60° C. to 150° C. although it depends on the types of solvent. The heated and dried film is aged preferably at room temperature and is left still for 3 to 10 days.

The alkyl acrylate and/or the alkoxy alkyl acrylate of the adhesive component has an OH group and its side chain consists of the alkyl group or the alkoxy alkyl group having 4 to 9 carbons. When the above material is once crosslinked with the isocyanate, ink leakage from the jet injection port can be perfectly prevented. When the adhesive film is re-peeled from the nozzle surface at the time of use, the adhesive agent is coagulated so as not to be left on the injection port surface. Therefore, the recording head can be immediately used and performs good recording.

In particular, when the acrylic polymer in the adhesive component contains 70 parts by weight or more of butyl acrylate, a change in properties of the seal tape and elution of the adhesive agent into an ink can be prevented. In this case, a re-peeling property of the adhesive agent with respect to the recording head is excellent.

A resin and glass are used together with a silicon substrate to form a recording head having a structure to be described later. Application fields of the present invention are not limited to a specific field regardless of a difference between peeling states of silicon, resin, and glass because the adhesive agent is not coagulated or left on the injection port surface.

When 100 parts by weight or 90 parts by weight or more of an acrylic polymer are obtained by crosslinking the alkyl acrylate and/or alkoxy alkyl acrylate with the isocyanate to obtain an adhesive agent (in this case, a combination of additives or a combination of a plurality of the above acrylic polymers is contained as a balance), a change of properties in adhesive agent brought into contact with an ink is not found, and no elution of the adhesive agent occurs. Therefore, clogging and unstable injection at the time of use of the printer can be prevented to obtain a more preferable result.

Examples of the film serving as a support for an adhesive agent according to the present invention are films of polyethyleneterephthalate, polypropylene, polyethylene, poly-4-methylpentene-1, vinyl chloride, a vinylidene chloride-vinyl chloride copolymer, polyvinylfluoride, polyvinylidenefluoride, a tetrafluoroethylene-ethylene copolymer, a tetrafluoroethylene-hexafluoropropylene-perfluoroalkylv inylether copolymer, and a laminate thereof. These films may be surface-treated to improve the adhesion strength of the adhesive agent in accordance with a corona discharge treatment, flaming, a plasma treatment or the like. The thickness of the base used in the present invention preferably falls within the range of 20 to 50 μm and more preferably 25 to 35 μm.

In addition to the above properties, when a peeling strength of the seal tape with respect to the glass is increased from 250 g/25 mm to 900 g/25 mm, a totally stable tendency is obtained. This can be defined as one of the preferable conditions. The peeling strength is defined complying with a 180° peeling test based on a measurement method of an adhesion force in JIS-Z-0237 using a glass plate as a base at 25° C. The thickness of the adhesive layer preferably falls within the range of 5 to 100 μm and more preferably 7 to 50 μm. In any case, even if the thickness of the adhesive layer is increased, the adhesive agent is not left on the injection port, and a desired adhesive seal tape can be formed.

The adhesive tape of the present invention is effective for a nozzle surface which is treated for ink repellency, and provides excellent adhesion strength without causing deterioration of the tape and the nozzle surface.

The seal tape of the present invention has a form of a normal tape with an adhesive layer with respect to a base seal tape, a sheet, a plate material, or the like. A general structure may include a separator on the surface of the adhesive layer as a protective film of the adhesive layer.

The adhesive agent of the present invention can be used as a high-strength adhesive tape or a large tape. Examples of ink-jet recording heads in the following description with reference to the accompanying drawings indicate only an effective invention for particularly a storage method, but also techniques used in a variety of applications for various articles.

BRIEF DESCRIPTION OF THE DRAWINGS

FIGS. 15A to 15E show storage containers of the present invention, in which FIG. 15A is a plan view thereof, FIG. 15B is a front view thereof, FIG. 15C is a right side view thereof, FIG. 15D is a partial enlarged view showing a storage state of part of an injection port of the ink-jet cartridge, and FIG. 15E is a partial enlarged view of a portion A of FIG. 15B, showing a flange portion of the storage container body;

FIGS. 18A to 18F show other storage containers of the present invention, in which FIG. 18A is a side sectional view thereof, FIG. 18B is a plan view thereof, FIG. 18C is a front view thereof, FIG. 18D is a right side view thereof, FIG. 18E is a bottom view thereof, and FIG. 18F is a partial enlarged view of a portion A, showing a flange portion of the storage container body.

EMBODIMENTS

Figure 1:
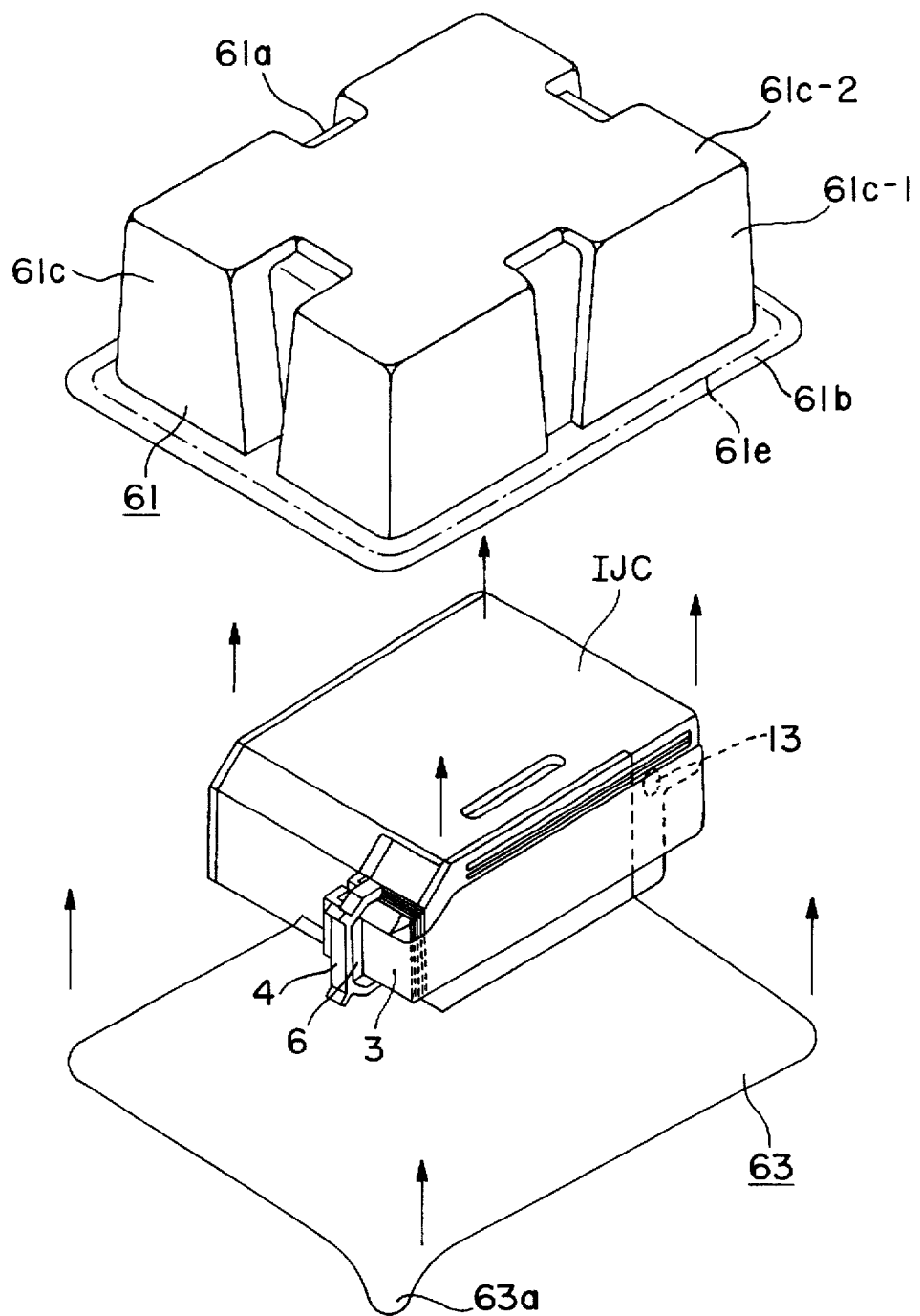
FIG. 1 is a developed perspective view showing an example of a storage container (packing container) of an ink-jet cartridge according to the present invention.

The present invention will be described in detail by way of its examples.

[Seal Tape: Example 1]

| Butyl acrylate | 75 parts by weight |
| Ethyl acrylate | 10 parts by weight |
| Acrylamide | 10 parts by weight |
| 2-hydroxyethylacrylate | 5 parts by weight |

These materials were solution-polymerized in a solvent mixture (50:50 volume ratio) of toluene and butyl acetate at 85° C. for 8 hours using benzoin peroxide as a catalyst to obtain a polymer having a weight average molecular weight of 300,000. In order to eliminate the monomers and low polymers from the resultant polymer, the polymer was precipitated using ethanol, thereby eliminating the monomers and low polymers together with the solvent. The resultant polymer was dried and then dissolved in a solvent mixture (50:50 volume ratio) of toluene and ethyl acetate, and 4.8 g of diphenylmethane diisocyanate were added to the solution with respect to 100 parts by weight of the polymer, thereby preparing a coating solution. This coating solution was applied to a 30-μm thick corona-discharged polyethyleneterephthlate film to form a film having a thickness of 15 μm (solid content). The film was heated at 100° C. for 10 minutes and was aged at room temperature for a week, thereby obtaining an adhesive tape according to the present invention.

Evaluation Method

1. Adhesive Force (Reference Evaluation)

A 180° peeling test was performed using a glass plate as a test base plate on the basis of an adhesive force test method complying with JIS-Z-0237. The measured value is summarized as an adhesive force (g/mm) in Table 1.

2. Influence on Ink

A tape having an area of 15 mm$^2$ was dipped in 50 g of an ink having the following composition, and elution of organic and inorganic impurities of the ink upon at 80° C. aging for a week was measured by the following method. This ink is suitably stored in an ink-jet recording head (to be described later) or supplied for recording:

Ink Composition

| Glycerin | 10 parts by weight |
| Urea | 5 parts by weight |
| Ethanol | 5 parts by weight |
| Water | 80 parts by weight |

(a) Inorganic Impurity Elution Check

Elution concentrations of ink elements, i.e., Ca, Mg, Mn, Si, Cu, Fe, Sn, Al, Ni, Zn, and Cr after the test were measured by an ICP emission spectroscopic analysis apparatus SPS1100-H (available from Seiko Denshi Kogyo), and differences between the initial values and the measurement values were calculated to check the eluted elements. The check result is summarized in column 2(a) of the inorganic impurity.

(b) Organic Impurity Elution Check

Absorption of light components having wavelengths of 240 nm to 400 nm was measured by a self-recording spectroscopic photometer U-3200 (Hitachi, Ltd.), and differences between the initial values and the measurement values were compared with each other.

By these differences, the presence/absence of organic impurity elution was determined and is summarized in column 2(b) of organic impurity in Table 1.

3. Influence of Adhesive Agent on Nozzle Surface (a) Observation Determination with Microscope A seal tape was applied to a glass surface and dipped in the ink, and was left still at 60° C. for 3 months. The seal tape was then removed from the ink and was peeled from the glass surface, thereby observing the state of the surface.

A seal tape sample having an adhesive agent which is not left on the glass surface is evaluated as ⊙, a seal tape sample having an adhesive agent whose mark is left on the glass surface is evaluated as ○, and a seal tape sample having an adhesive agent which is peeled from the base and left on the glass surface is evaluated as △. A seal tape sample which is peeled from the glass surface during dipping is evaluated as x. These symbols are shown in column 3(a) of Table 1.

The test results in columns 2(a) and 3(a) can also be regarded as effects of a storage method of the present invention.

(b) Test by Ink-Jet Head

This test exhibits an effect of an ink-jet recording head and a recording apparatus using this head.

An ink-jet printer having an ink-jet head (FIG. 1) having 64 nozzles at a resolution of 16 nozzles/mm was used, an ink having the following composition was filled in the ink-jet head, and a seal tape of the present invention was applied to the nozzle surface. The tape was left still at 60° C. for a month, the seal tape was then peeled from the nozzle surface, and an image was printed.

Ink Composition

| C.I. Food Black | 22 parts by weight |
| Glycerin | 10 parts by weight |
| Urea | 5 parts by weight |
| Ethanol | 5 parts by weight |
| Water | 78 parts by weight |

The above printed matters were evaluated, and their states are summarized in column 4(b).

[Seal Tape: Example 2]

| Butyl acrylate | 70 parts by weight |
| 2-ethylhexylacrylate | 12 parts by weight |
| N-methylol acrylamide | 10 parts by weight |
| 2-hydroxypropylmethacrylate | 8 parts by weight |

The above materials were dissolved in ethyl acetate and stirred and polymerized at 60° C. for 12 hours using benzoyl peroxide as a catalyst to obtain a polymer having a weight average molecular weight of 700,000. This polymer was precipitated using methanol to eliminate the solvent, low polymers, and monomers. The resultant polymer was dried. This polymer was dissolved in ethyl acetate again, and 7.3 parts by weight of dicyclohexylmethane diisocyanate were added to the solution with respect to 100 parts by weight of the polymer, thereby preparing a coating solution.

This coating solution was applied to a 30-μm thick corona-discharged polyethyleneterephthalate film to form a film having a thickness of 25 μm (solid content). The film was dried at 60° C. for five minutes and was dried at 95° C. for 10 minutes and was aged at room temperature for a week, thereby obtaining an adhesive tape according to the present invention.

Tests were conducted following the same procedures as in Example 1 of the seal tape, and evaluation results are summarized in Table 1.

[Seal Tape: Example 3]

| Butyl acrylate | 75 parts by weight |
| 3-methoxypropylacrylate | 15 parts by weight |
| 2-hydroxyethylacrylate | 10 parts by weight |

These materials were dissolved in a solvent mixture (80:20 volume ratio) of ethyl acetate and methyl isobutyl ketone and were polymerized at 85° C. for 10 hours using benzoin peroxide as a catalyst, thereby obtaining a polymer having a weight average molecular weight of 400,000. In order to eliminate low polymers and the monomers from the resultant polymer, the polymer was precipitated using isopropyl alcohol to eliminate the solvent, the low polymers, and the monomers. The resultant polymer was dried and then dissolved in ethyl acetate again, and 7.6 parts by weight of xylylene diisocyanate were added to the solution with respect to 100 parts by weight of the polymer, thereby preparing a coating solution.

This coating solution was applied to a 50-μm thick corona-discharged polyvinyl chloride film to form a film having a thickness of 50 μm (solid content). The film was dried at 90° C. for 10 minutes and was aged at room temperature for a week, thereby obtaining an adhesive tape according to the present invention.

Tests were conducted following the same procedures as in Example 1 of the seal tape, and evaluation results are summarized in Table 1.

[Seal Tape: Example 4]

| Butyl acrylate | 50 parts by weight |
| Octyl acrylate | 30 parts by weight |
| 2-hydroxypropylmethacrylate | 20 parts by weight |

These materials were polymerized in benzene at 80° C. for 8 hours using benzoin peroxide as a catalyst to obtain a polymer having a weight average molecular weight of 420,000. The benzene solution was poured into ethanol to precipitate the polymer, thereby eliminating the monomers and low polymers. The resultant polymer was dried and was then dissolved in a solvent mixture (50:50 volume ratio) of toluene and ethyl acetate, and 11.7 parts by weight of hexamethylene diisocyanate were added to the solution with respect to 100 parts by weight of the polymer, thereby preparing a coating solution.

This coating solution was applied to a 30-μm thick polyethyleneterephthalate film to form a film having a thickness of 8 μm (solid content). The film was dried at 100° C. for 8 minutes and was aged at room temperature for five days, thereby obtaining an adhesive tape according to the present invention.

Tests were conducted following the same procedures as in Example 1 of the seal tape, and evaluation results are summarized in Table 1.

In order to clarify effects of the present invention, seal tape samples of the comparative examples were prepared, the test were conducted following the same procedures as in Example 1 of the seal tape, and the test results are also summarized in Table 1.

[Seal Tape: Comparative Example 1]

| 2-ethylhexylacrylate | 80 parts by weight |
| Ethyl acrylate | 10 parts by weight |
| Acrylamide | 10 parts by weight |
| 2-hydroxyethylacylate | 5 parts by weight |

These materials were polymerized in a solvent mixture (50:50 volume ratio) of toluene and butyl acetate at 85° C. for 5 hours using benzoin peroxide as a catalyst to obtain a polymer having a weight average molecular weight of 150,000. In order to eliminate the monomers and low polymers from the resultant polymer, the polymer was precipitated using methanol, thereby eliminating the monomers and low polymers together with the solvent. The resultant polymer was dried.

The resultant polymer was then dissolved in a solvent mixture (50:50 volume ratio) of toluene and butyl acetate, and 3.6 parts by weight of xylene diisocyanate were added to the solution with respect to 100 parts by weight of the polymer, thereby preparing a coating solution.

This coating solution was applied to a 30-μm thick corona-discharged polyethyleneterephthalate film to form a film having a thickness of 20 μm (solid content). The film was dried at 90° C. for 10 minutes and was aged for 10 days, thereby obtaining an adhesive tape sample of Comparative Example 1 of the seal tape.

Tests were conducted following the same procedures as in Example 1 of the seal tape, and evaluation results are summarized in Table 1.

[Seal Tape: Comparative Example 2]

| | |
|---|---|
| Glycidylmethacrylate | 3 parts by weight |
| 2-ethylhexylacrylate | 64 parts by weight |
| Methacrylate | 3 parts by weight |
| Ethyl acrylate | 30 parts by weight |

These materials were stirred and dissolved in acetone and solution-polymerized at 60° C. for 5 hours to obtain a polymer having a weight average molecular weight of 800,000. 50 parts by weight of an oil-soluble phenol resin and 100 parts by weight of butyl acrylate were added to this polymer, and 20 parts by weight of a rosin-modified maleic acid resin serving as a tackifier were mixed and stirred in the resultant solution.

This coating solution was applied to a 30-μm thick corona-discharged polyethyleneterephthalate film to form a film having a thickness of 15 μm (solid content). The film was dried at room temperature and was aged for 10 days, thereby obtaining an adhesive tape sample of Comparative Example 2 of the seal tape.

Tests were conducted following the same procedures as in Example 1 of the seal tape.

(Comparison Results)

When the evaluation results are compared with each other, the samples of the present invention exhibit excellent properties as compared with those of the comparative examples, as is apparent from Table 1.

According to the findings of the present inventors, in the present invention in which the above adhesive tapes are applied to the ink-jet recording heads, the first method of improving cohesion is one of the important conditions for solely achieving a sealing effect for preventing ink leakage from an ink injection port until use. According to the first method, even immediately after the adhesive tape is peeled from the recording head, it is found that a drawback caused by a residual adhesive agent can be eliminated.

When the second and third methods of improving cohesion are used together with the first method of crosslinking the polymer with the isocyanate, it is also confirmed that the problems inherent to the residual adhesive agent can be perfectly solved even if a pressure acts on the adhesive tape. This is particularly effective when a seal tape press cap (to be described later) or the like is used.

The findings of the present inventors will be summarized as follows. When a pressure acts on the press member for a short or long period of time, a deformation force acts on the adhesive layer to cause a creep phenomenon, i.e., a flowing phenomenon of the adhesive agent. In particular, since the adhesive agent is always exposed to the ink, a plastic effect acts on the adhesive layer or between the adhesive layer and the support for supporting this adhesive layer due to permeation of the ink. This problem is not solved by simple water repellency unlike in the case of water resistance. Quite contrary, the adhesive layer can contain a certain amount of moisture which rejects extra moisture permeating therein. Therefore, the present invention provides the effect of controlling the creep.

TABLE 1

| | 1 Adhesion Force (g/25 mm) | 2(a) Inorganic Impurity | 2(b) Organic Impurity | 3(a) Injection State | 3(b) Image |
|---|---|---|---|---|---|
| Seal Tape Example 1 | 400 | None | None | ☺ | Good |
| Seal Tape Example 2 | 550 | None | None | ☺ | Good |
| Seal Tape Example 3 | 850 | None | None | ☺ | Good |
| Seal Tape Example 4 | 250 | None | None | ○ | Good |
| Seal Tape Comparative Example 1 | 1100 | None | Contained | x | Presence of image defect caused by non-injection |
| Seal Tape Comparative Example 2 | 1300 | Sn, Ca | Contained | Δ | Presence of image defect caused by non-injection |

[Embodiment of Ink-Jet Recording Head]

A common arrangement in the following embodiment comprises a seal member having an injection portion and the adhesive layer for closing an ink tank air communication port, and a press member for urging the seal member against the injection portion. The injection unit and the ink tank air communication port are kept closed in a non-recording mode of the recording head.

The present invention can utilize the characteristic features described to provide a recordable state without any ink scattering even if the inertia resistance is large or small in severe conditions of transportation and sales of recording heads.

Figure 2A:
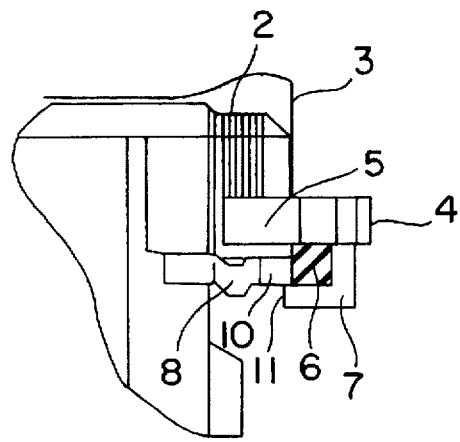
FIGS. 2A and 2B are a plan view and a side view, respectively, for partially explaining an embodiment of FIG. 13.
Figure 2B:
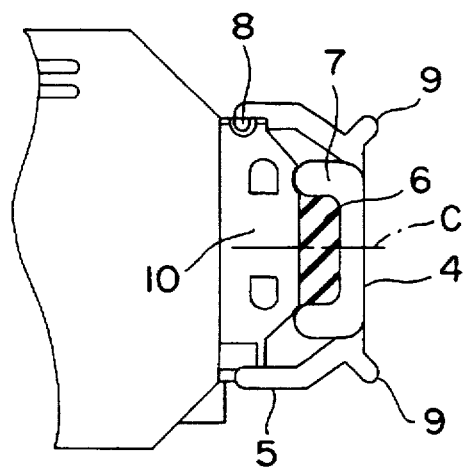
Figure 5:
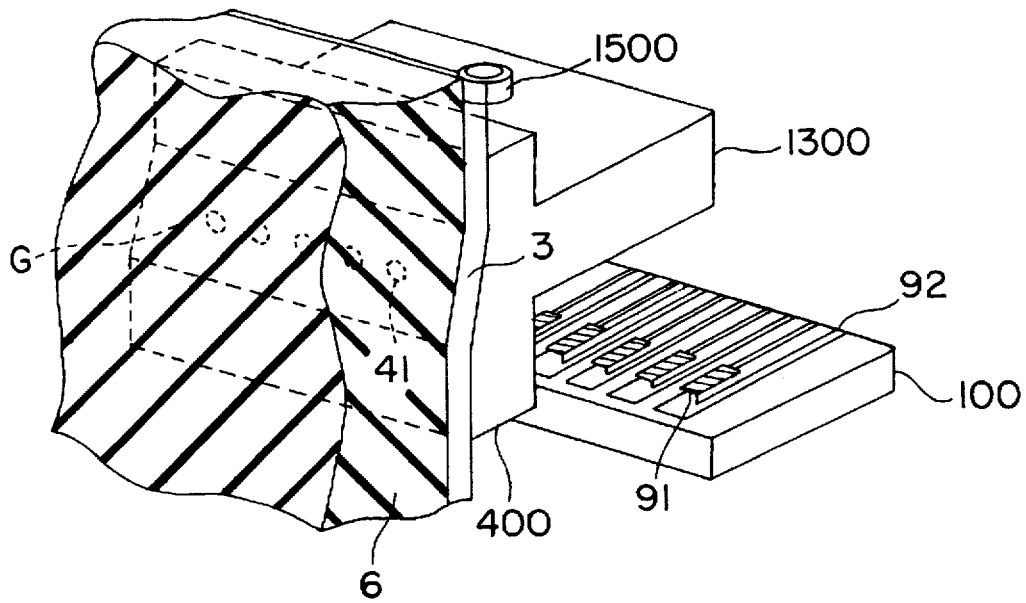
FIG. 5 is a partial exploded view showing another embodiment of the present invention.
Figure 6:
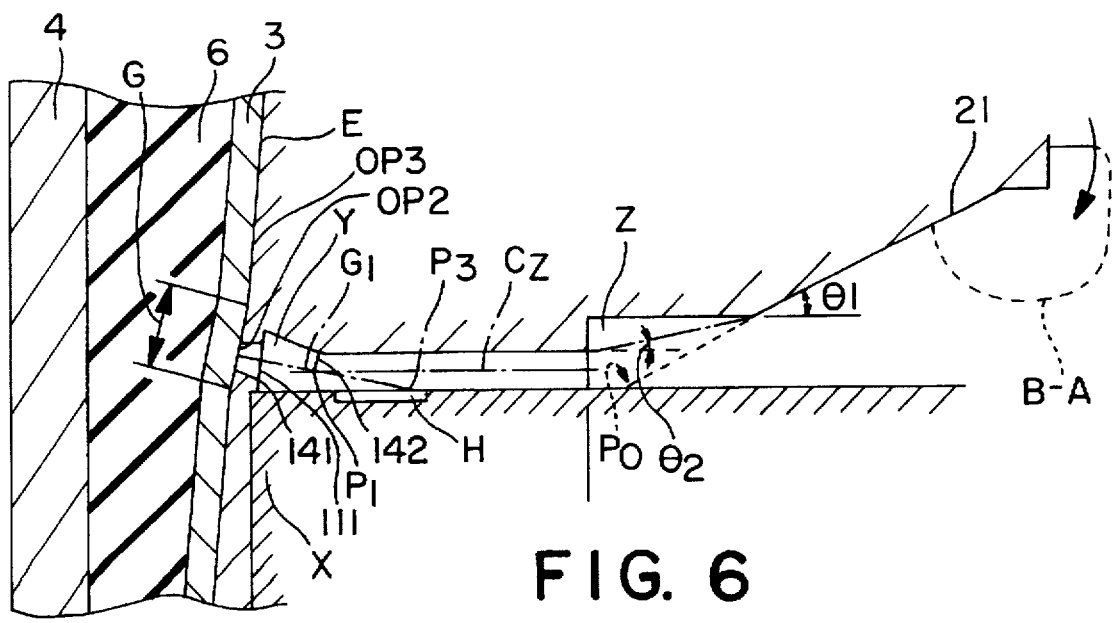
FIG. 6 is a view for explaining a section of a recording head of the embodiment of FIG. 5.
Figure 7A:
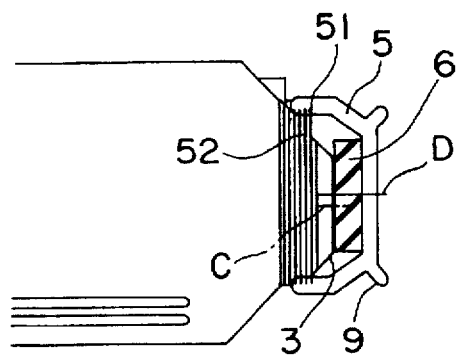
FIGS. 7A, 8A, and 9A, FIGS. 7B, 8B, and 9B, and FIGS. 7C, 8C, and 9C are side views, front views, and plan views, respectively, for explaining other embodiments of the present invention.
Figure 8A:
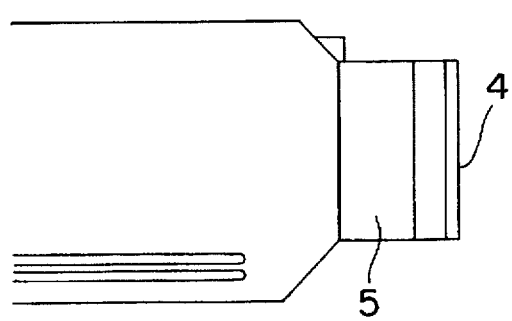
Figure 9A:
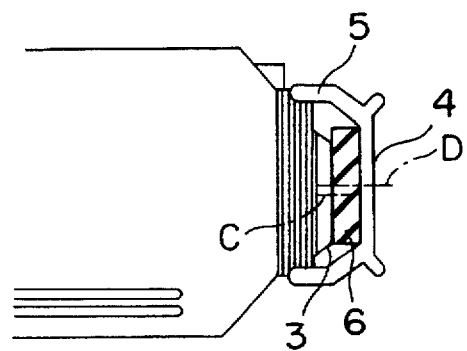
Figure 10:
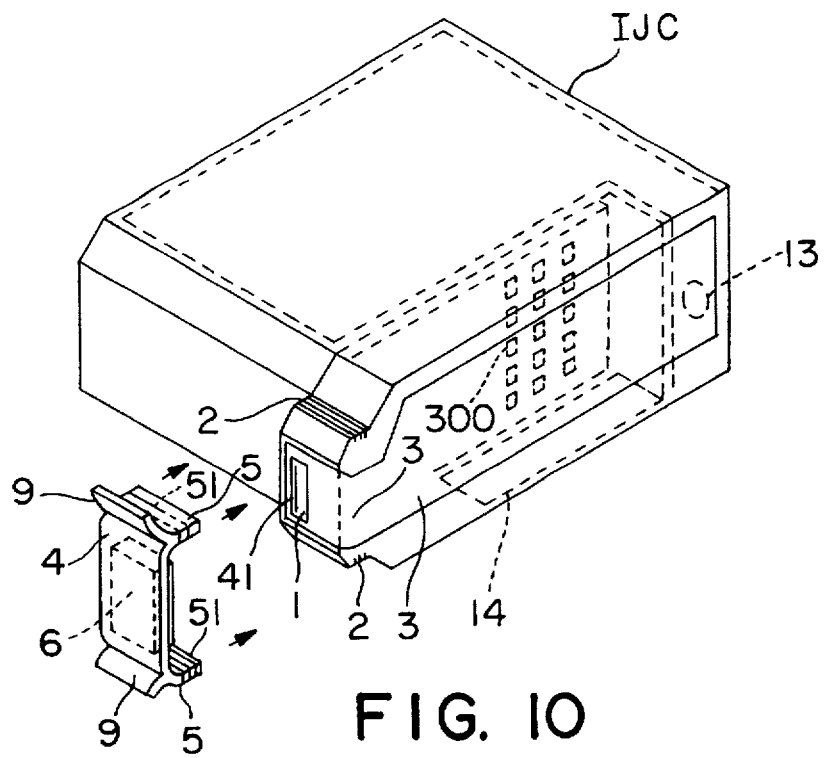
FIGS. 10 and 11 are perspective views showing a modification of a structure of a recording head.
Figure 11:
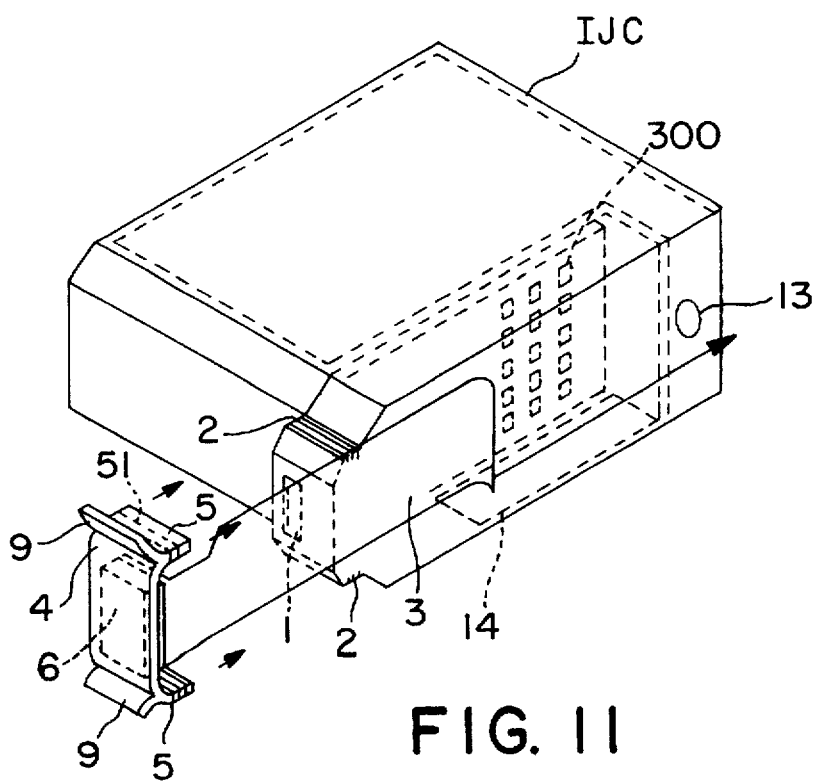
Figure 12:
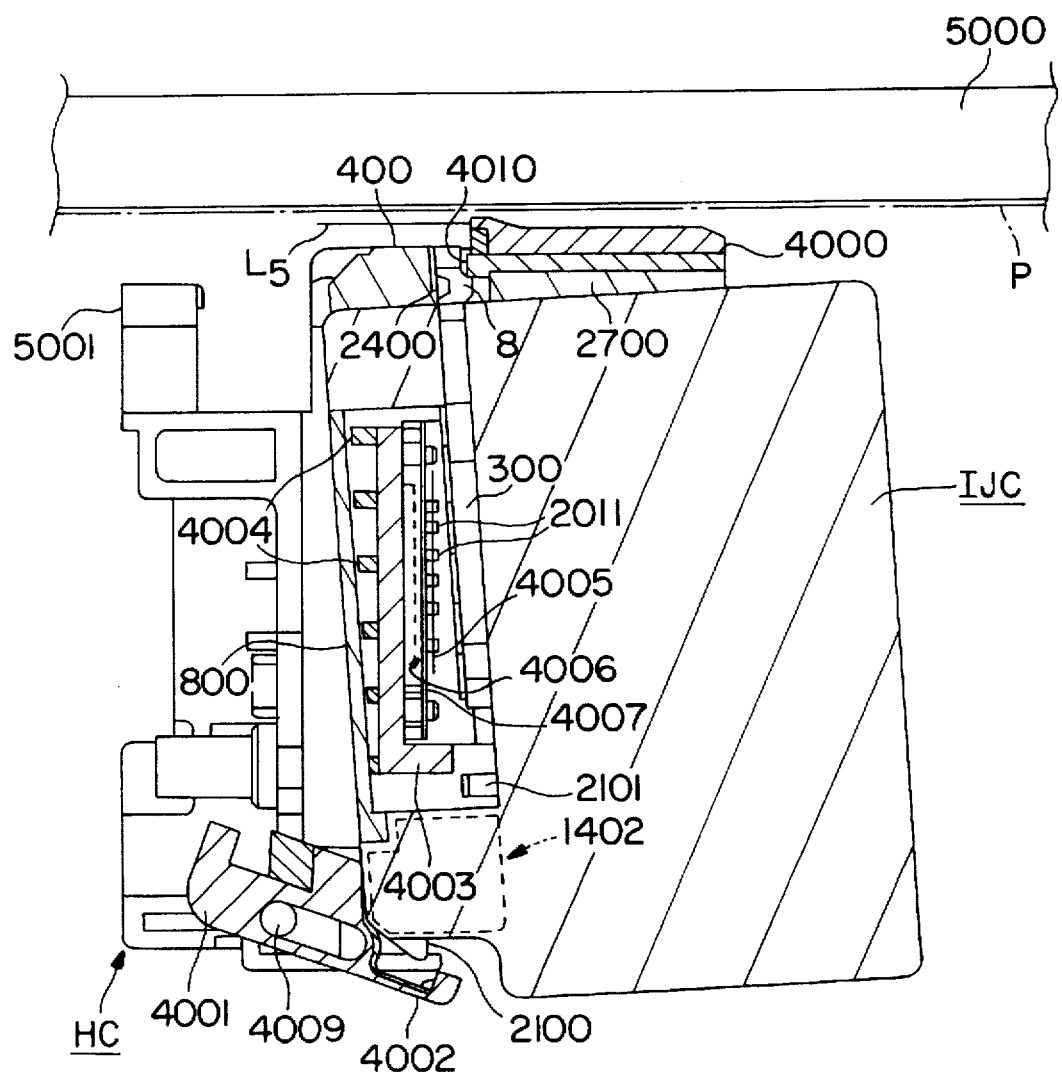
FIG. 12 is a partial sectional view for explaining a mechanism for attaching or detaching the recording head to or from a recording apparatus main body.
Figure 13A:
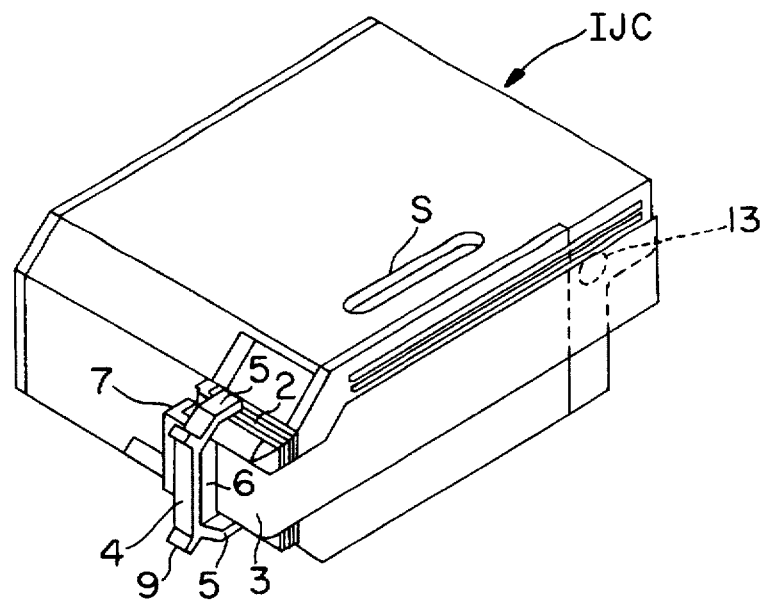
FIGS. 13A and 13B are a perspective view and a partial exploded view, respectively, showing Example 1 of the present invention.
Figure 13B:
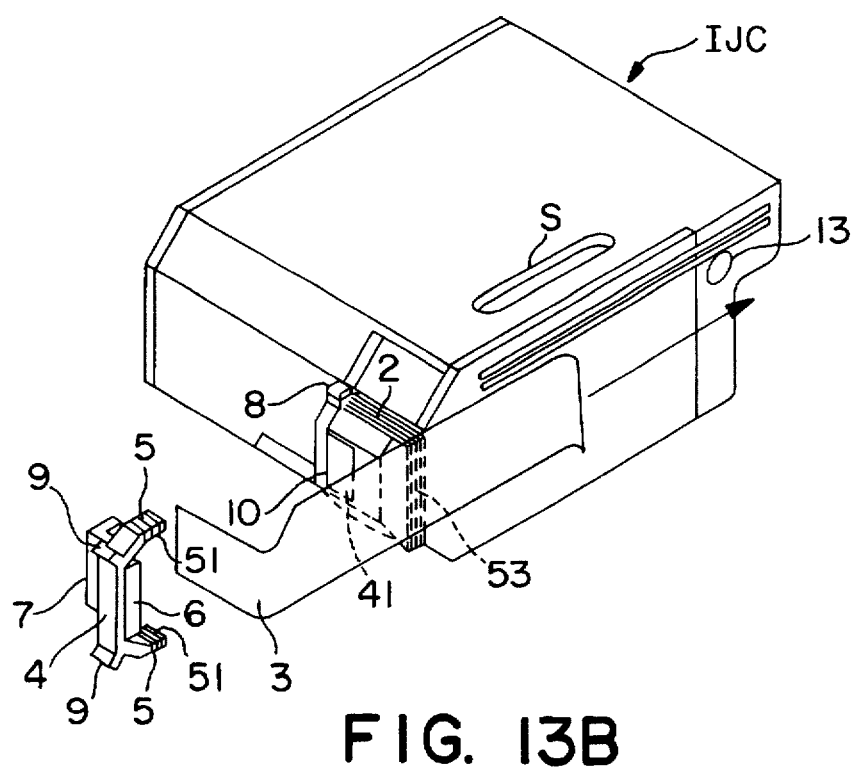

FIGS. 13A and 13B are a perspective view and an exploded view, respectively, showing the first embodiment of the present invention. FIGS. 2A and 2B are a plan view and a side view, respectively, showing part of FIGS. 13A and 13B. FIGS. 3A and 4A and FIGS. 3B and 4B are plan views and side views, respectively, for explaining a modification of FIGS. 2A and 2B. FIG. 5 is a partial exploded view showing another embodiment of the present invention. FIG. 6 is a view for explaining a section of a recording head of the embodiment of FIG. 5. FIGS. 7A, 8A, and 9A. FIGS. 7B, 8B, and 9B, and FIGS. 7C, 8C, and 9C are side views, front views, and plan views, respectively, for explaining other embodiments of the present invention. FIGS. 10 and 11 are perspective views showing a modification of a structure of a recording head, and FIG. 12 is a partial sectional view for explaining a mechanism for attaching or detaching the recording head to or from a recording apparatus main body.

Referring to FIGS. 13A and 13B, reference symbol IJC denotes an ink-jet cartridge. The ink-jet cartridge IJC has an ink storage unit which incorporates an ink absorption member. The ink-jet cartridge IJC comprises a recording head (the recording head comprises heat energy generation elements 91 (FIG. 5), a substrate 100 having electrodes 92 formed thereon, and an orifice plate 400 having a plurality of injection ports 41; in this embodiment, a top plate 1300 and the orifice plate 400 for defining a liquid path 140 are integrally formed) which is detachably mounted in the integral recording apparatus main body and to which an ink is supplied through a supply pipe communicating with the ink storage unit. Reference symbol S denotes an opening for monitoring electrical connection portions (to be described later). The opening S is formed in the upper surface portion of the recording head. Reference numeral 10 denotes a base plate of the substrate of the recording head. The base plate 10 is made of an aluminum plate having a positioning portion 8 which is engaged with a carriage positioning portion 4010 of the recording apparatus main body in FIG. 12 to perform positioning of the recording head as a whole. Reference numeral 1 denotes an injection unit surface including the orifice plate. Reference numeral 41 denotes a recording ink injection unit. In this embodiment, although an opening for absorbing a back wave during recording and openings such as dummy nozzles are not illustrated, the injection unit surface 1 incorporate these openings. Reference numeral 2 denotes groove portions formed in the upper and lower surfaces retracted from the injection unit surface 1. In this embodiment, four grooves are formed in each groove portion, as shown in FIG. 13A and 13B. Reference numeral 53 denotes side groove portions each having four grooves continuous with the grooves of the corresponding groove portion 2 and located at side surfaces opposite to the base plate 10. When a large amount of ink is filled in the groove portions 2 due to ink scattering, the groove portions 53 guide the ink downward. The recording head groove portions 2 receive an elastic force to be engaged with corresponding groove portions 51 of a cap 4.

Reference numeral 3 denotes a seal sheet having a size enough to cover the entire portion of the injection unit surface 1 of the recording head. As shown in FIG. 2A, the seal sheet has a portion extending outward from the recording head end portion. This outward extending portion serves as a collar for peeling the sheet from the recording head. The sheet 3 is adhered to the recording head such that an adhesive agent is interposed between the sheet 3 and the injection unit surface 1 in FIGS. 2A to obtained a simple adhesion state.

As shown in FIGS. 13A and 13B, the cap 4 has a width corresponding to the injection unit surface 1. The cap 4 integrally comprises two opposite arms 5, an elastic member 6 fixed on the inner surface of the cap 4 and separated from the arms 5, a positioning or elastic deformation amount regulating portion 7 formed on a cap surface on the base plate 10 side, and collars 9 utilized to attach the cap 4 to the recording head or detach the cap 4 from the recording head. Each of the arms 5 has an inner surface with the groove portions 51 each having three grooves engaged with the corresponding groove portion 2.

In this embodiment, as is apparent from FIGS. 2A and 2B, the seal sheet 3 extends onto the base plate 10, and at the same time the elastic member 6 is formed to oppose the base plate 10. This structure further improves a sealing effect since the injection ports 41 are close to the base plate 10. The portion 7 has a length to be brought into slight contact with the rear surface of the base plate 10 when the cap 4 is mounted on the recording head. This contact length is about 1 mm in this embodiment. With this slight contact structure, the elastic member 6 of the cap is accurately positioned by the arms 5 and the positioning portion 7 within the range of interposing the base plate 10. With this simple structure, the sealing effect of the above opening can be achieved without posing any problem described above.

Figure 3A:
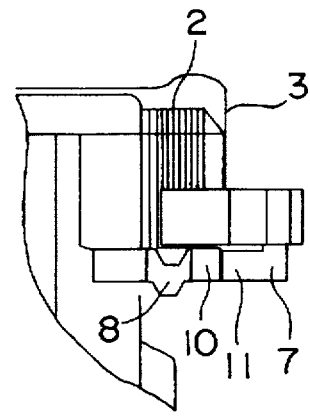
FIGS. 3A and 4A and FIGS. 3B and 4B are plan views and side views, respectively, for explaining a modification of FIGS. 2A and 2B.
Figure 3B:
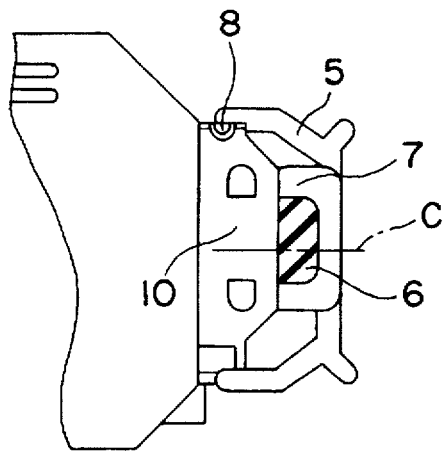

FIGS. 3A and 3B show a structure in which a press area of the elastic member is concentrated on the injection ports. For this reason, the portion in the structure of the elastic member 6 in FIGS. 2A and 2B, which is opposite to the base plate 10 is omitted. In this embodiment, since the portions 7 serve as the elastic deformation amount regulation portions and all the injection ports can be perfectly sealed with a uniform pressure distribution, this is one of the preferred embodiments. Other arrangements in FIGS. 3A and 3B except for the above arrangement are the same as those in FIGS. 1 and FIGS. 2A and 2B.

Figure 4A:
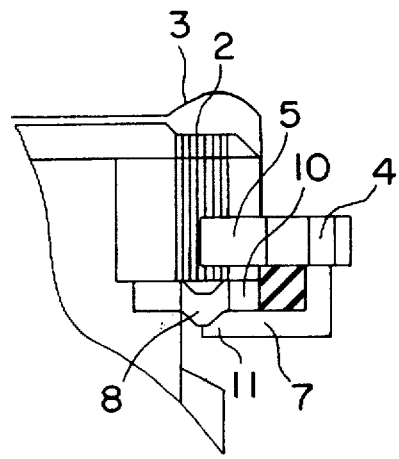
Figure 4B:
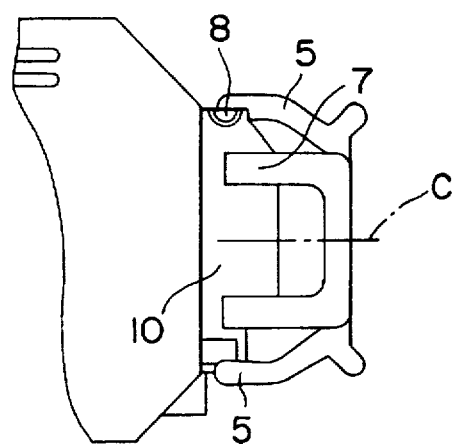

FIGS. 4A and 4B show a structure in which the portions 7 in FIGS. 2A and 2B are further extended to serve as a guide for mounting a cap member 4 on the recording head. In this embodiment, the length of the portions 7 is almost equal to that of the arms 5. The cap cannot be mounted unless the portions 7 are accurately mounted on the rear surface of the base plate 10. Therefore, the cap 4 and the elastic member are made compact to further improve operability during cap mounting.

An engaging state of the groove portions 2 and 51 in this embodiment will be briefly described. At the time of cap mounting, when the collars 9 are moved inward, the arms 5 are elastically deformed to increase a distance therebetween. In this state, the recording head is located between the cap arms 5 and the collars are released to engage the groove portions 2 and 51 with each other. At this time, even if a positional error occurs by one groove, this error can be easily eliminated such that the depth of the groove portions is set to be 1 mm or less and the urging force of the arms is balanced with the elastic force generated by deformation of the elastic member 6. In this state, if the number of upper engaging grooves is equal to that of lower engaging grooves, the entire balance can be optimized. The sealing state can become perfect, and a pressure distribution is also optimized, thereby assuring the sealing property. Any elastic material and thickness of the elastic member 6 can be selected if the sheet 3 is pressed to retain the sealing force when the groove portions 2 and 51 are engaged with each other.

More specifically, the sheet 3 comprises a flexible sheet having a thickness of about 12 to 30 μm and consisting of polyethyleneterephthalate or ethylene tetrafluoride. The elastic member consists of silicone or polyurethane sponge having a thickness of about 3 mm. It is a matter of course that the present invention is not limited to the specific arrangement described above.

FIGS. 5 and 6 show an embodiment of the injection unit in which upper and lower surfaces form a step of about 30 μm with respect to a step forming surface G of about 70 μm. The present invention provides a perfect sealing state of any surface having such a step.

As is apparent from FIG. 6, a liquid chamber has a region Z continuous with a liquid path and extending toward the ink reception portion, and an inclined surface 21 extending from the ink reception portion to the region Z. A line extending from the inclined surface reaches a surface position $P_0$, of the substrate 8 which serves as a mounting side surface of the liquid path corresponding to an injection energy generating means H and opposite to the region Z. In this embodiment, the inclined surface 21 forms an angle of 22° with respect to a center line $C_2$ of the ink path and the line extending line of the liquid path. The right and left inner wall surfaces form an angle B of 15°.

The presence of this spread region Z provides the following effect. Small bubbles can be collected in the region Z. In addition, even if the collected bubbles are held in a region away from an extension of the liquid path in which the injection energy generating means H is present and the size of these small bubbles is increased, bubbles are guided in a direction away from the liquid path along the inclined surface, thereby greatly delaying occurrence of recording defects. In addition, since the line extending from the inclined surface reaches the side surface of the liquid path in which the injection energy generating means is located, even if bubbles generated by an impact force are apt to enter into the liquid path along the inclined surface, the side surface corresponding to the injection energy generating means serves as a barrier. Therefore, large bubbles do not enter into the liquid path, and recording defects are not formed accordingly. In an ink-jet recording head, the angles are not limited to the values described above. If the above angular limitations are added to this arrangement, the effect of the present invention will be apparently improved, as a matter of course.

The next arrangement is effective for suction and recovery. An effective arrangement for recovery under pressure is also disclosed. Reference numeral 141 denotes an isosceles-trapezoidal end opening of a liquid path on the orifice plate side. Reference numeral 111 denotes an isosceles-trapezoidal inner opening of the orifice plate which is brought into contact with the opening 141. The injection portion also has an isosceles-trapezoidal shape. In this embodiment, the ink feed path from the liquid path to the injection portion has a sectional shape of an isosceles trapezoid. That is, when the liquid path has a shape of an isosceles trapezoid having a bottom side as the injection energy generation means side, conditions for dispersing the bubbles within the liquid path are nonuniform, and the generated or entering bubbles collect on short sides of the trapezoid. In addition, a route of discharging bubbles during recovery can be concentrated, thereby further enhancing a bubble discharge effect. When the injection unit corresponding to the liquid path having a sectional shape of an isosceles trapezoid has a short side of the shape of the liquid path as a short side and a long side of the shape of the liquid path as a long side, a turbulent state of the ink during recovery can be prevented, thereby stabilizing the bubble discharge effect. In addition, this shape is more preferably a shape of an isosceles trapezoid. In this embodiment, the most preferable shape has a first region (i.e., a liquid path from a line $P_1$ to the openings 141 and 111) in which a liquid path having a shape of an isosceles trapezoid is widened near the injection unit of the liquid path, and a second region (i.e., the opening 11 to opening 11) which is continuous with the flow path of the first region in a shape of an isosceles trapezoid but has a width smaller than that. The bubbles can be completely eliminated without almost generating a turbulence of the ink. In this embodiment, since the first and second regions are symmetrical about a plane (line $C_1$) formed by connecting middle points between the legs of the trapezoid such as a section of the liquid path in FIG. 6, a pressure distribution during recovery can be uniform, and generation of small turbulences in the discharge region can be greatly reduced. Since a line extending from the line $C_1$ reaches a point $P_3$ on the surface of the heat generating element H, injection energy can be effectively used for injection.

According to the present invention, a top plate member and an injection unit forming member which constitute a common liquid chamber are integrally formed. A simple structure is constituted by a liquid path forming member having a step portion engaged with the substrate and a press member for linearly applying a pressure from a portion above the liquid path of the liquid path forming member to the alignment direction of the liquid paths and for pressing and holding the step portion upon engagement between the step portion and the front end portion of the substrate, thereby almost eliminating generation of bubbles and hence performing excellent recording.

In this embodiment, the orifice plate is formed by different angles (inflection points H and I) OP1, OP2, and OP3. The injection direction of ink droplets is determined to be an extension direction of the line C1, so that the recording plane is a plane perpendicular to the line C1. In this embodiment, the recording medium is moved upward on the sheet of paper of the drawing. Since a surface of the plate-like member which has the injection unit has a cross-sectional shape having a small step, cleaning performance at the time of wiping can be further improved without mounting special components inside and outside the cap, and a meniscus withdrawal of the ink at the injection unit at the time of capping can also be prevented. Injection failure of the ink and various problems caused by this injection failure can be more properly eliminated with a simple structure.

The height of the region Z in FIG. 6 is equal to or smaller than that of the liquid path. An angle $\theta_2$ formed by the region Z is 10° and is preferably half or less than an angle $\theta_1$ of the inclined surface 21.

As is apparent from FIG. 6, the surface of each injection port and its peripheral surface are properly sealed with the sheet 3. This state is properly maintained in an elastic deformation state of the elastic member 6, thus obtaining a better effect than that in the conventional structure.

Figure 7B:
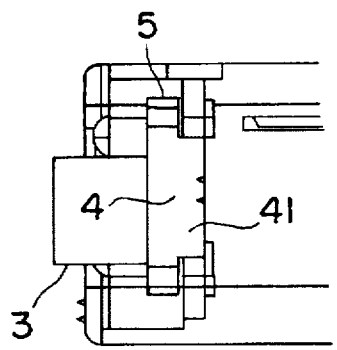
Figure 7C:
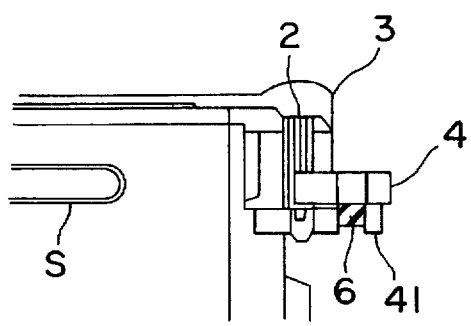

In an embodiment shown in FIGS. 7A, 7B, and 7C, the portions 7 in the embodiment of FIGS. 2A and 2B are eliminated.

A portion of the elastic member 6 for pressing a base plate 10 is accurately urged by an extension portion 41 of the cap body. This simplifies the structure of the cap member, and the cap can be slid along groove portions 51 to attach the cap to the recording head or detach the cap from the recording head.

Figure 8B:
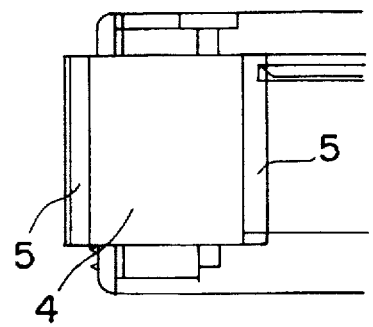
Figure 8C:
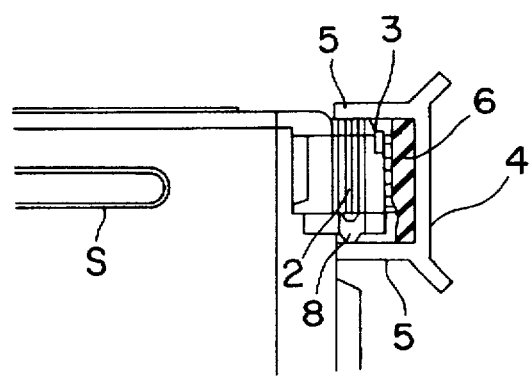

FIGS. 8A, 8B, and 8C show a structure in which a cap is engaged with positioning portions 8 of a base plate 10 and groove portions 53. A seal sheet 3 is mounted only inside the cap. With this structure, substantial mounting precision can be improved by utilizing positioning precision of the recording head with respect to the recording apparatus.

Figure 9B:
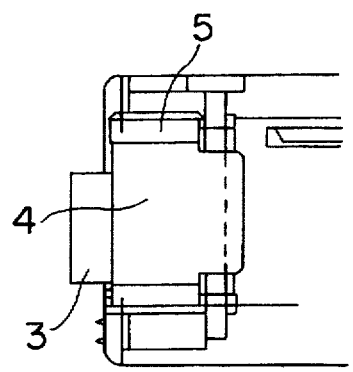
Figure 9C:
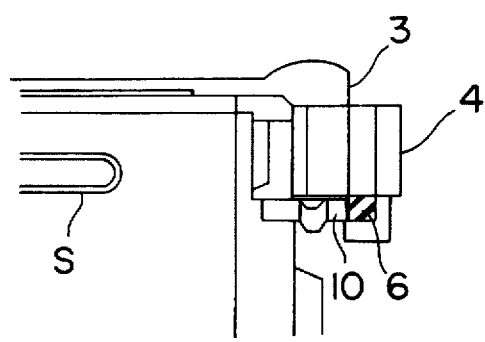

In an embodiment of FIGS. 9A, 9B, and 9C, the cap width of the embodiment of FIGS. 2A and 2B is increased to cover the entire front surface of the recording head having an injection unit surface 1 of the recording head, thereby further improving the mounting state.

FIG. 10 shows an embodiment in which the portions 7 in the embodiment of FIGS. 9A to 9C are eliminated. Since a sufficient space is assured, a mechanism for improving positional precision need not be added. When a cap is mounted on a recording head, a stable mounting state can be easily obtained.

FIG. 11 discloses a cap member obtained by integrally forming the seal sheet 3 with the surface of an elastic member of a cap, a recording head using this seal sheet 3, and a storage method. This structure is effective for a recording head upon its removal from a carriage whose structure is disclosed in FIG. 12.

As is apparent from the perspective view of FIG. 12, the IJC has a large ink storage volume and has a shape in which a front end portion of an ink-jet unit slightly extends from the front end of an ink tank. This ink-jet cartridge IJC is fixedly supported by electric contacts and a positioning means (to be described later) of a carriage HC placed on an ink-jet recording apparatus main body IJRA. At the same time, the ink-jet cartridge IJC is of a disposable type with respect to the carriage HC.

Referring to FIG. 12, reference numeral 5000 denotes a platen roller for guiding a recording medium P upward on the sheet of paper of the drawing. A carriage HC is moved along the platen roller 5000. The carriage HG comprises a front plate (thickness: 2 mm) 4000 located on the front surface side of the ink-jet cartridge IJC, i.e., on the platen side of the carriage, an electrical connection support plate 4003 for supporting a flexible sheet 4005 having pads 2011 corresponding to pads 201 of a wiring board 200 of the cartridge IJC and for supporting a rubber pad sheet 4007 for supporting the rear surface of the flexible sheet 4005 so as to urge the pads 2011, and a positioning hook 4001 for fixing the ink-jet cartridge IJC to a recording position. The front plate 4000 has two positioning extension surfaces 4010 respectively corresponding to positioning extensions 2500 and 2600 of a cartridge support 300. When the cartridge is mounted, the front plate 4000 receives a force in a direction perpendicular to the extension surfaces 4010. For this reason, a plurality of reinforcing ribs (not shown) extending in a direction of vertical force are formed on the front plate on the platen roller side.

These ribs have head protection portions extending slightly (about 0.1 mm) from a front surface position $L_5'$ toward the platen roller side upon mounting of the cartridge IJC. The electrical connection support plate 4003 has a plurality of reinforcing ribs 4004 in a direction (vertical direction) different from that of the ribs of the front plate, so that a degree of lateral extension from the platen side to the hook 4001 is reduced. This also can serve as a function of inclining the cartridge when it is mounted, as shown in FIG. 12. In order to stabilize an electrical contact state, the support plate 4003 has two hook-side positioning surfaces 4006 in correspondence with the extension surfaces 4010. The positioning surfaces 4006 apply force to the cartridge in a direction opposite to that of the force applied on the cartridge by the two positioning extension surfaces 4010. A pad contact area is formed between the hook-side positioning surfaces 4006 so that a deformation amount of projections of the rubber sheet 4007 having the projections corresponding to the pads 2011 is solely determined. These positioning surfaces are brought into contact with the surface of the wiring board 300 when the cartridge IJC is fixed to a recordable position. In this embodiment, since the pads 201 of the wiring board 300 are distributed to be symmetrical about the line $L_1$, the deformation amounts of the respective projections of the rubber sheet 4007 are uniform to further stabilize the contact pressure of the rubber sheet 4007. The pads 201 are distributed in two upper rows, two lower rows, and two columns.

The hook 4001 has an elongated hole engaged with a stationary axis 4009. When the hook 4001 is pivoted counterclockwise from the illustrated position by utilizing a space of the elongated hole, the hook 4001 is moved to the left along the platen roller 5000, thereby positioning the ink-jet cartridge IJC with respect to the carriage HC. The hook 4001 can be moved by any mechanism, but a lever or the like is preferably used as this moving mechanism. In any case, during pivotal movement of the hook 4001, the cartridge IJC is moved toward the platen roller, and at the same time, the positioning projections 2500 and 2600 are moved to positions at which they can be brought into contact with the positioning surfaces 4010 of the front plate. During movement of the hook 4001 to the left, a 90° hook surface 4002 is kept in contact with a 90° surface of a pawl 2100 of the cartridge IJC, and at the same time, the cartridge IJC is turned about a contact area between the positioning surfaces 2500 and 4010 within a horizontal plane. Finally, the pads 201 and 2011 are brought into contact with each other. When the hook 4001 is brought into a predetermined position, i.e., a fixed position, perfect contact between the pads 201 and 2011, perfect contact between the positioning surfaces 2500 and 4010, contact between the 90° surface 4002 and the 90° surface of the pawl, and contact between the wiring board 300 and the positioning surface 4006 are simultaneously achieved to complete holding of the cartridge IJC by the carriage.

The pawl 2100 engaged with an engaging surface 4002 of the 90° surface of the positioning hook 4001 of the carriage is located in FIG. 12, and a force for positioning the carriage acts on an area parallel to a reference surface.

In the above embodiment, all combinations disclosed in the claims of the present invention are not disclosed. However, appropriate combinations of the above structures are incorporated in the present invention.

The present invention technically associated with FIGS. 2A to 13 will be described in detail with reference to FIG. 1 and the drawings from FIG. 14.

FIG. 1 is a developed perspective view showing a structure of a storage container (packing container) of the ink-jet cartridge according to the present invention. FIG. 14 is a perspective view of the storage container after assembly, and FIGS. 15A to 15E show a storage container according to the present invention, in which FIG. 15A is a plan view thereof, FIG. 15B is a front view thereof, FIG. 15C is a right side view thereof, FIG. 15D is a partial enlarged view showing a storage state of a portion of an injection port of the ink-jet cartridge, and FIG. 15E is a partial enlarged view of a portion A of FIG. 15B so as to illustrate a flange portion of the storage container body.

The packing container consists of a container body 61 and a lid member 63. The container body 61 and the lid member 63 are integrally formed to constitute the packing container.

The container body 61 has a wall portion 61c which is kept in noncontact with the ink-jet cartridge IJC as a storage content, recess portions 61a, extending from the wall portion 61c toward the content storage area, for supporting the ink-jet cartridge IJC and fixing it, and a flange portion 61b used to be formed integrally with the lid member 63. The injection port of the ink-jet cartridge IJC is kept in noncontact with the walls in the storage space. As shown in these drawings, of the four recess portions 61a, when the depth of the recess portion corresponding to the injection port is large and the injection port is located deep inside the storage space, the injection port can further be properly protected. At the same time, reverse insertion of the ink-jet cartridge can be prevented (so-called erroneous insertion prevention).

The wall portion 61c must have sufficiently high rigidity and is made of a material and has a sufficiently large thickness so as to satisfy this requirement. For example, although the thickness of the wall portion 61c may be appropriately selected in accordance with the type of material, it is 0.1 mm or more, preferably 0.3 mm or more, and more preferably 0.5 mm or more. The maximum thickness of the wall portion 61c is, e.g., 1.2 mm or less.

The recess portions 61a preferably has a cushion property for damping or absorbing an impact so as to protect the content. That is, when the recess portions 61a are formed to have the same strength and rigidity as those of the wall portion 61c, the impact acting on the wall portion 61c tends to be directly transmitted to the content, and the content may be damaged. Judging from this point of view, each recess portion 61a preferably has a relatively small thickness and elasticity. The thickness of the recess portions 61a can be appropriately selected in accordance with the type of material. For example, this thickness is 0.8 mm or less, preferably 0.6 mm or less, and more preferably 0.4 mm or less. The lower limit of the thickness is 0.05 mm or more.

Various types of resins may be used as a material for the container body 61. For example, the container body 61 is molded using a resin. Molding is preferable in view of workability and manufacturing cost.

The container body 61 can be integrally molded by injection molding or vacuum molding using various types of resins. In particular, injection molding using a resin such as an acrylonitrile-butadiene-styrene copolymer resin (ABS resin), polystyrene, polypropylene, polyethylene, or polyethyleneterephthalate facilitates adjustment of the thicknesses of the wall portion 61c and the recess portions 61a at relatively low cost. In addition, desired characteristics of the respective portions of the container body 61 can be easily obtained.

When the flange portion 61b is formed at the bottom portion of the container body 61, bonding between the container body 61 and a bottom plate 63 can be easily and appropriately performed. The flange portion 61b can be molded together with other portions of the container body 61 upon its integral molding. The thickness of the flange portion 61b can be almost equal to that of the wall portion 61c. A reinforcing rib 61e is preferably formed along a bonding region 62 between the container body 61 and the lid member 63. This rib 61e is formed to extend toward the lid member 63, as shown in FIG. 15. However, the extension direction may be reversed. However, when the rib 61e extends toward the lid member 63, bonding between the container body 61 and the lid member 63 is further facilitated, resulting in convenience.

When corners such as the right portions of the recess portions 61a and the wall portion 61c are curved, as shown in the drawings, damping resistance to impacts can be improved. The radius of curvature of the curved portion is preferably set to be large and is properly selected in accordance with the size of each recess portion 61a. The radius of curvature is, e.g., 2 mm or more, preferably 3 mm or more, and more preferably 5 mm or more.

The shape of each recess portion 61a is properly selected so as to protect the ink-jet cartridge IJC and effectively fix it in the packing container. In the illustrated example, the ink-jet cartridge IJC is supported by the four recess portions 61a. This support form is preferable in view of protection and fixing of the ink-jet cartridge IJC. The number of recess portions 61a can be appropriately selected.

When a clearance between the ink-jet cartridge support portions of the recess portions 61a and the ink-jet cartridge is excessively large, cluttering or positional errors of the ink-jet cartridge occur inside the packing container. However, when the clearance is excessively small, a storage state of the ink-jet cartridge inside the container body 61 is undesirably impaired. In this case, an impact tends to be easily transmitted from the wall portion 61c. The clearance may be properly selected in accordance with the structure of the recess portions 61a and matching between the recess portions 61a and the ink-jet cartridge. For example, the clearance falls within the range of about 0.5 mm to 3 mm, and preferably about 0.5 mm to 2 mm.

The material and thickness of the lid member 63 are selected in accordance with the weight, rigidity, and the like of the ink-jet cartridge. The lid member 63 is constituted by, for example, a resin or metal film, a resin or metal sheet, a resin or metal plate, or a laminated body including at least one thereof. When the laminated body is used as the lid member 63, and when a surface (to be referred to an outer layer hereinafter) of the lid member 63 which is not adhered to the container body 61 is paper, it is susceptible to environmental changes and particularly humidity changes. The paper absorbs humidity and may be curled and deformed. A humidity resistance layer made of aluminum, vinylidene chloride, polypropylene, or the like is preferably formed on the outer layer. In this case, a force in a direction of peeling will not act on an adhesion portion 62 between the container body 61 and the lid member 63 upon curl deformation of the paper. The humidity resistance layer is preferably a polypropylene film having a thickness of 15 to 100 μm in view of manufacturing cost and mechanical strength.

Various bonding methods may be utilized to bond the lid member 63 and the container body 61 which stores the ink-jet cartridge IJC therein. For example, the container body 61 and the lid member 63 may be made of a single resin material and may be bonded by thermal fusion, ultrasonic welding or the like. An easy peel layer may be formed in a region necessary for bonding and may be utilized for bonding. A method utilizing the easy peel layer facilitates removal of the lid member 63 from the container body 61 during unpacking. This method has an advantage in that the ink-jet cartridge is less damaged. When humidity resistance of the contents and easy unpacking are taken into consideration, use of the easy peel layer is preferable. The easy peel layer may be a layer made of one of various types of hot melt materials, a polyethylene material, an Ebal material, or the like.

A knob portion 63a is preferably formed in the lid member 63 and is used to remove the lid member 63 from the container body 61. The knob portion 63a is formed at a position near the injection port of the ink-jet cartridge in FIG. 1. More preferably, the knob portion 63a is formed at a position farthest from the injection port due to the following reason. When a user holds the knob portion 63a to remove the lid member 63 from the container body 61, his hand is not brought into contact with the injection port to be protected in the ink-jet cartridge.

A material for the packing container according to the present invention is properly selected to maintain the humidity atmosphere of the content, i.e., to achieve humidity resistance and to prevent evaporation of the moisture of the contents to the external atmosphere.

For example, as a material of the container body 61, a material obtained by coating a vinylidene chloride layer or an aluminum layer on each resin material, a humidity nonpermeable material such as polypropylene, or the like is used to obtain the humidity atmosphere maintaining function described above. Polypropylene is preferable in view of moldability and workability.

Similarly, as a material of the lid member 63, a material obtained by coating a vinylidene chloride layer or an aluminum layer on a resin film, sheet or plate, or a paper sheet or plate, a humidity nonpermeable material such as polypropylene, or the like is used to obtain the humidity atmosphere maintaining function described above. Polypropylene is preferable in view of moldability and workability. In order to simultaneously obtain an impact damping property and the humidity atmosphere maintaining function, for example, a material obtained by coating an aluminum layer on paper, a layer (e.g., an easy peel layer) for sealing and adhering the lid member to the container body is used, and a polypropylene layer is formed on a nonadhesion surface (outer surface) for preventing curling. In particular, a laminated body having an aluminum layer and a polypropylene layer serving as an outermost layer on the nonadhesive layer side is preferable to simultaneously obtain the impact damping property and the humidity atmosphere maintaining function.

When a vacuum molding method using polypropylene in formation of the container body 61 is utilized, it is preferable to obtain curved upright portions of the recess portions 61a and the wall portion 61c so as to improve the impact damping property of the container body 61 and at the same time improve the humidity atmosphere maintaining function of the container body 61 described above.

According to male molding wherein a material is extended in vacuum for a portion except for a ceiling portion 61c-2 in a direction from the ceiling portion 61c-2 to the bottom (flange portion 61b) to obtain the recess portions 61a, side surfaces 61c-1 of the wall portion 61c, curved portions, and the like, the thicknesses of the respective portions can be further uniformed, pinholes are not formed, and the humidity nonpermeable property of the respective portions is improved.

When curved portions are not formed in a container body obtained by vacuum molding, boundaries between the recess portions and the wall portion of the container body and a boundary between the wall portion and the flange portion are formed as thin corner portions. In this case, pinholes may be formed, damage upon dropping of the container occurs, and the humidity nonpermeable property of the thin corner portions may be degraded. For this reason, the boundary portions are formed as the curved portions, and formation of thin portions can be further prevented. The humidity nonpermeable property can be uniformed throughout the container body, and a rigid outer portion having high resistance to impact upon dropping of the container can be obtained.

When a transparent or opaque material is selected to form the container body 61 and/or the bottom plate 63, the ink-jet cartridge 62 can be observed in a packed state.

As shown in FIG. 1, a cover member 3 for covering (sealing) the injection ports of the ink-jet cartridge is provided to minimize evaporation of the ink from the injection ports. The humidity in the storage space can be optimally maintained, and curling of the lid member can be prevented. In addition, the ink supply path from the ink tank to the injection ports can be maintained in a good state.

The cover member 3 of the present invention is not limited to the tape-like member described above, but is preferably a tape-like member due to the following advantages. The tape-like member can be easily handled (e.g., it can be easily peeled off). The tape-like member is excellent in maintaining a hermetic state of the injection ports. The tape-like member is not almost influenced by the size of the ink-jet cartridge because it is thin. The tape-like member can be manufactured at relatively low cost. A material for the cover member 3 is, e.g., polyethyleneterephthalate. The adhesive layer is formed on the adhesive side of the cover member 3 with respect to the head. The adhesive layer is similarly formed at a portion for sealing the outer air communication port 13.

Referring to FIG. 1, the press member 4 for urging the cover member 3 against the ink-jet cartridge IJC is formed in the ink-jet cartridge IJC. A preferable form of the press member 4 is a cap member having the ink absorbing member 6 at a position corresponding to the injection ports.

Use of the press member 4 prevents insertion of a hand into the injection port portion when the user removes the ink-jet cartridge IJC from the storage container. This is preferable in view of protection of the injection port particularly in the ink-jet cartridge. This press member 4 is preferably set so that it is not brought into contact with the wall portion 61c of the storage container body 61 even if the ink-jet cartridge is moved in the storage container within the clearance.

Figure 15A:
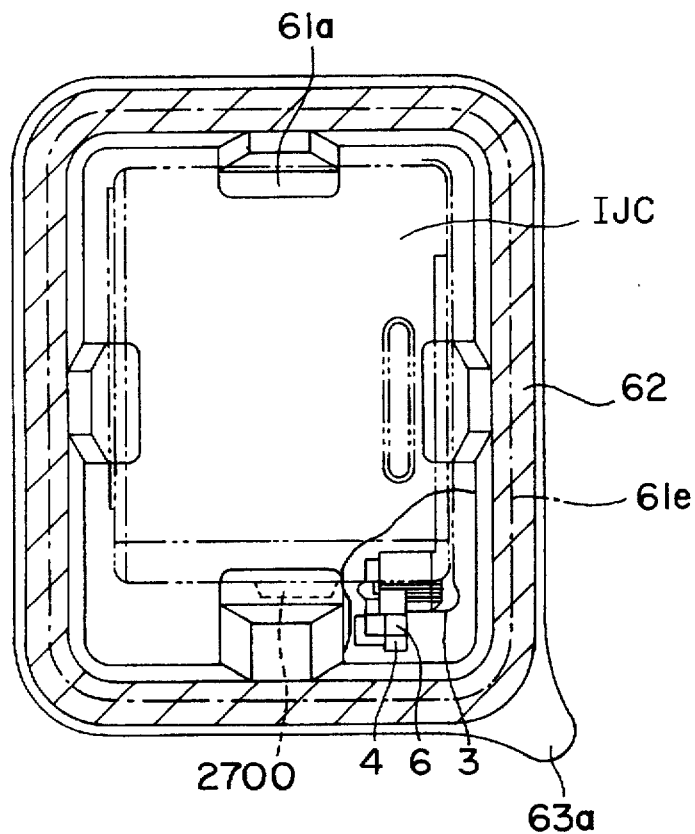
Figure 15B:
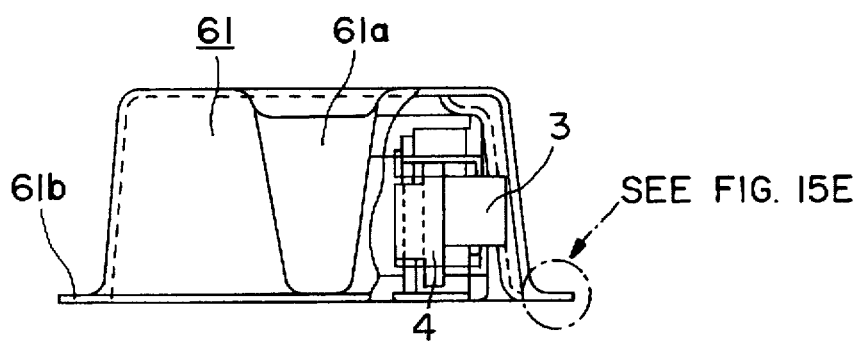
Figure 15C:
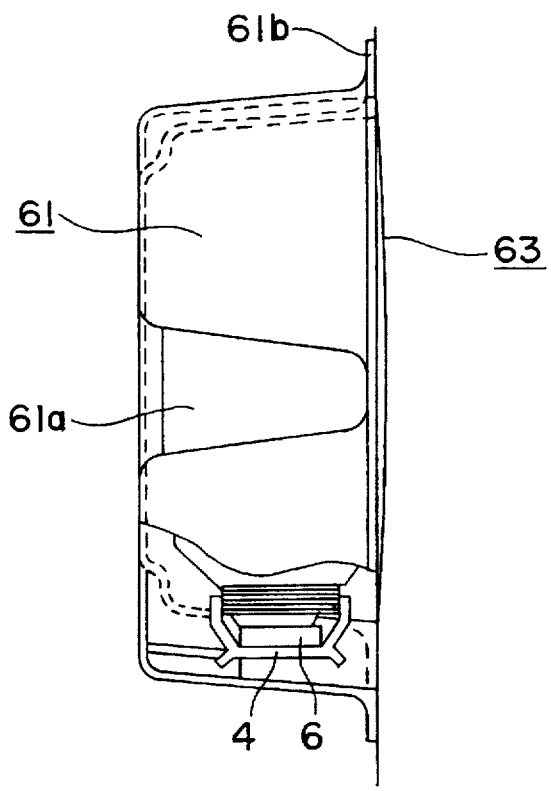
Figure 15D:
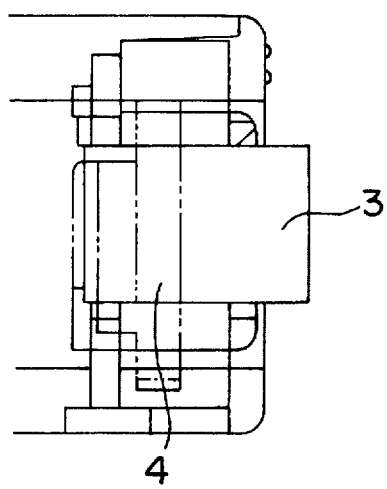
Figure 15E:
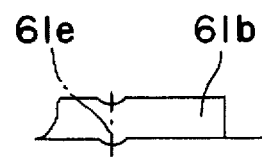
Figure 16:
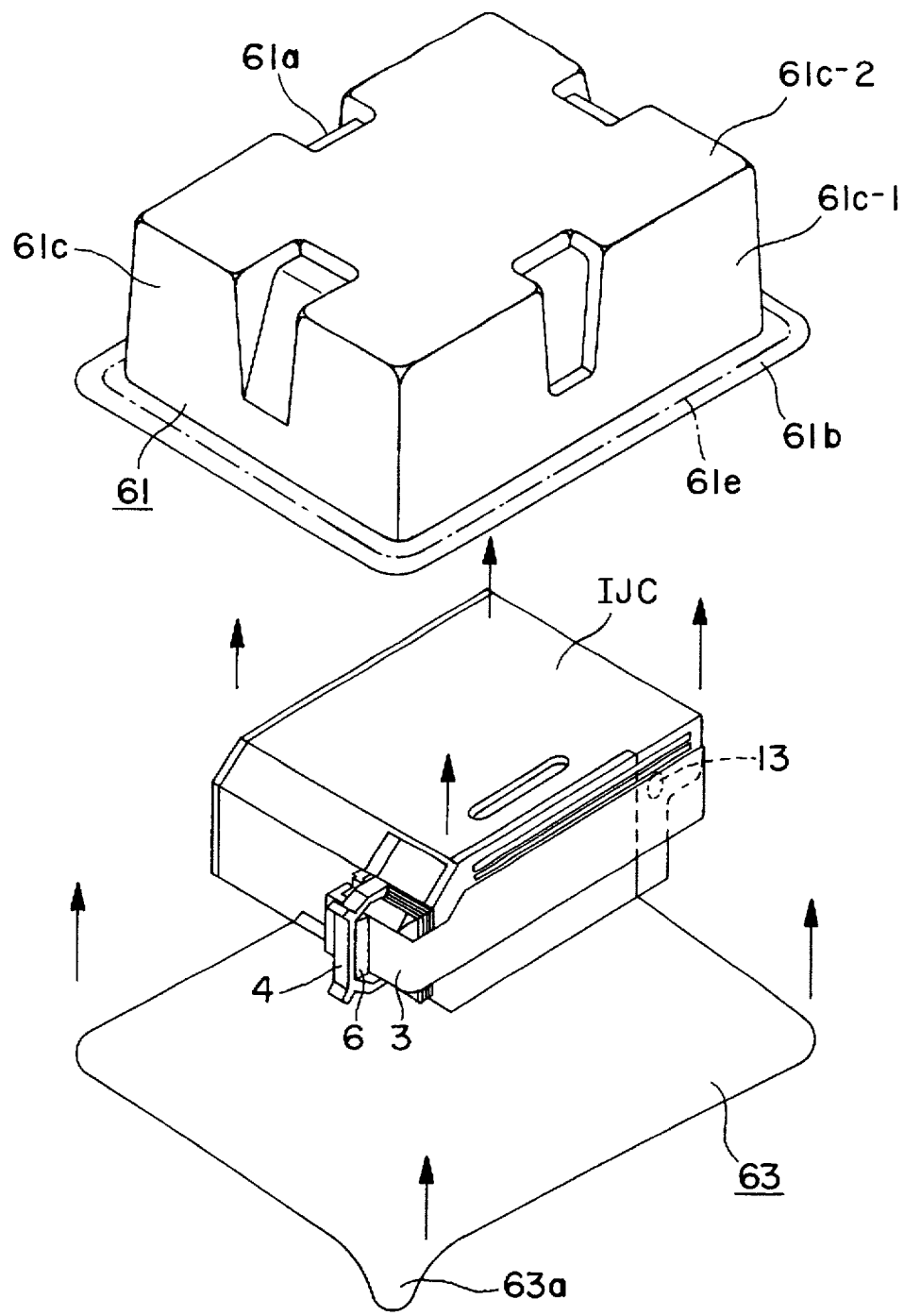
FIG. 16 is a developed perspective view showing another storage container (packing container) of the ink-jet cartridge according to the present invention.
Figure 17:
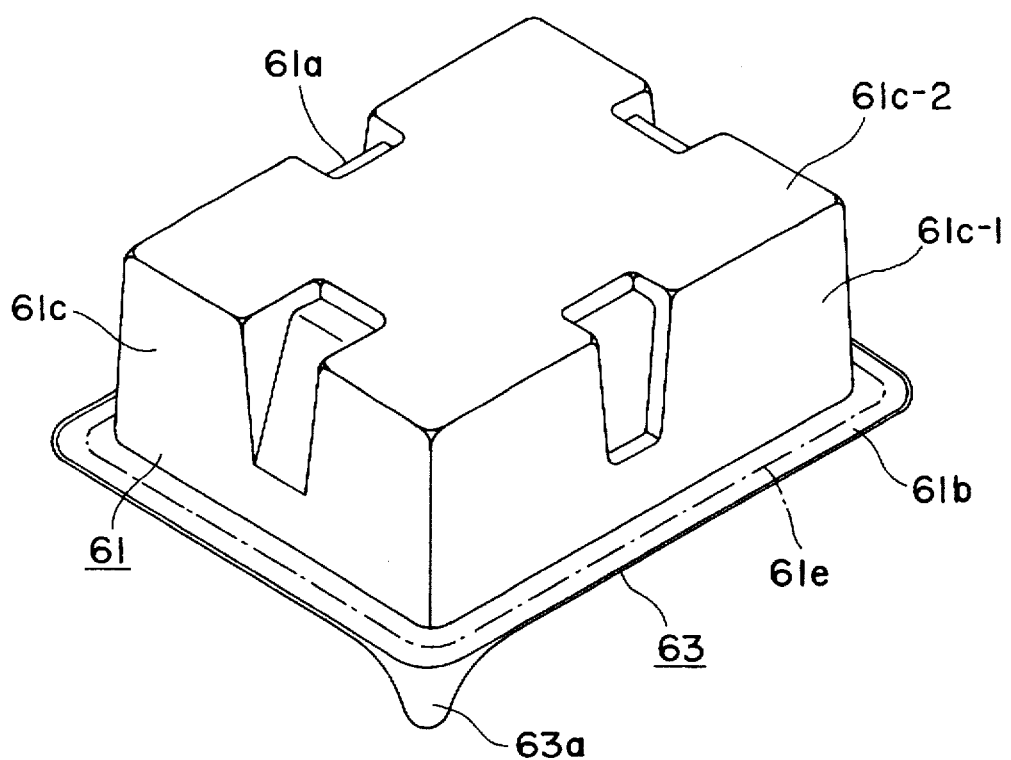
FIG. 17 is a perspective view of an assembly state of another storage container of the ink-jet cartridge according to the present invention.
Figure 18A:
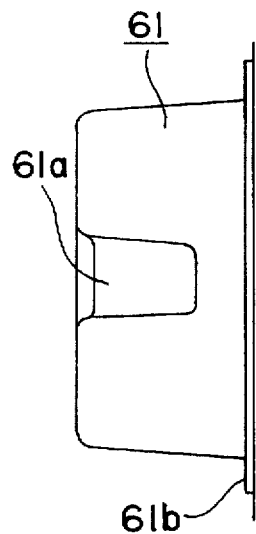
Figure 18B:
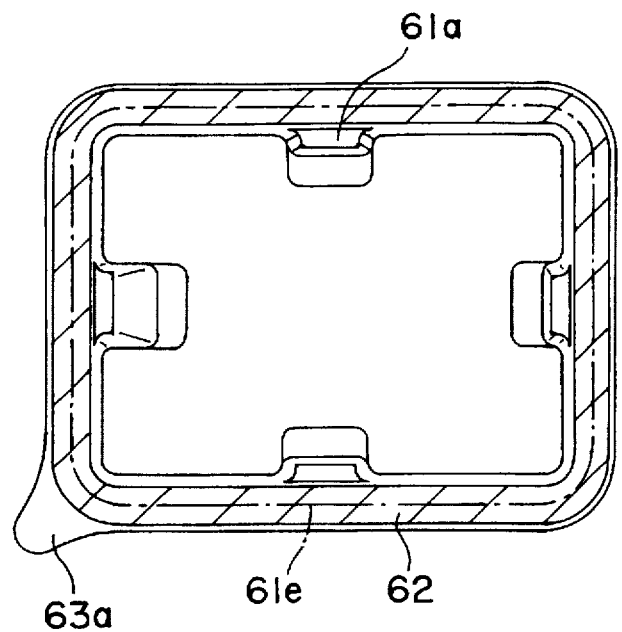
Figure 18C:
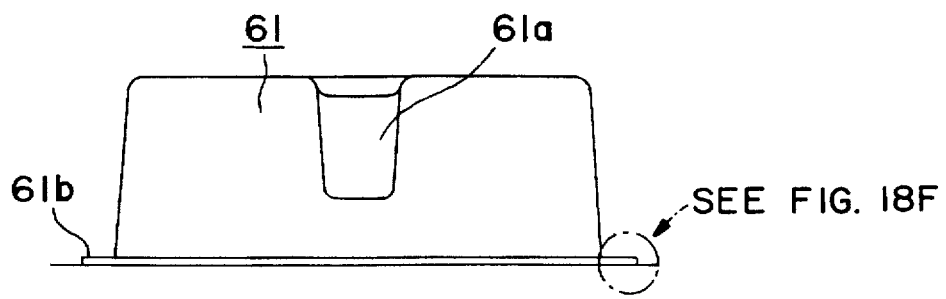
Figure 18D:
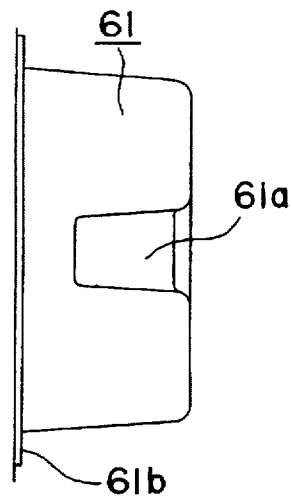
Figure 18F:
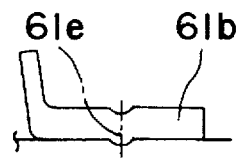
Figure 18E:
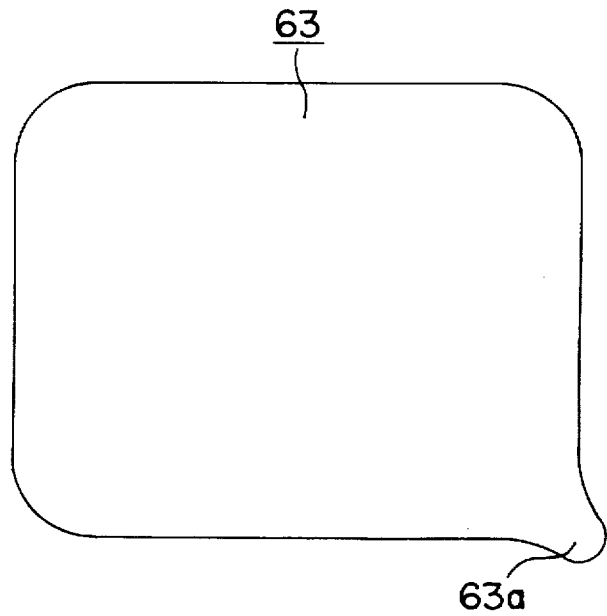

FIG. 16 is a developed perspective view showing another storage container (packing container) for the ink-jet cartridge according to the present invention, and FIG. 17 is a perspective view of the storage container after assembly. FIGS. 18A to 18F show another storage container according to the present invention, in which FIG. 18A is a left side view, FIG. 18B is a plan view thereof, FIG. 18C is a front view thereof, FIG. 18D is a right side view thereof, FIG. 18E is a bottom view thereof, and FIG. 18F is a partial enlarged view of a portion A of FIG. 18C, showing a flange portion of the storage container body (a portion illustrated as the front view in FIGS. 18A to 18F is different from that in FIGS. 15A to 15E).

Figure 14:
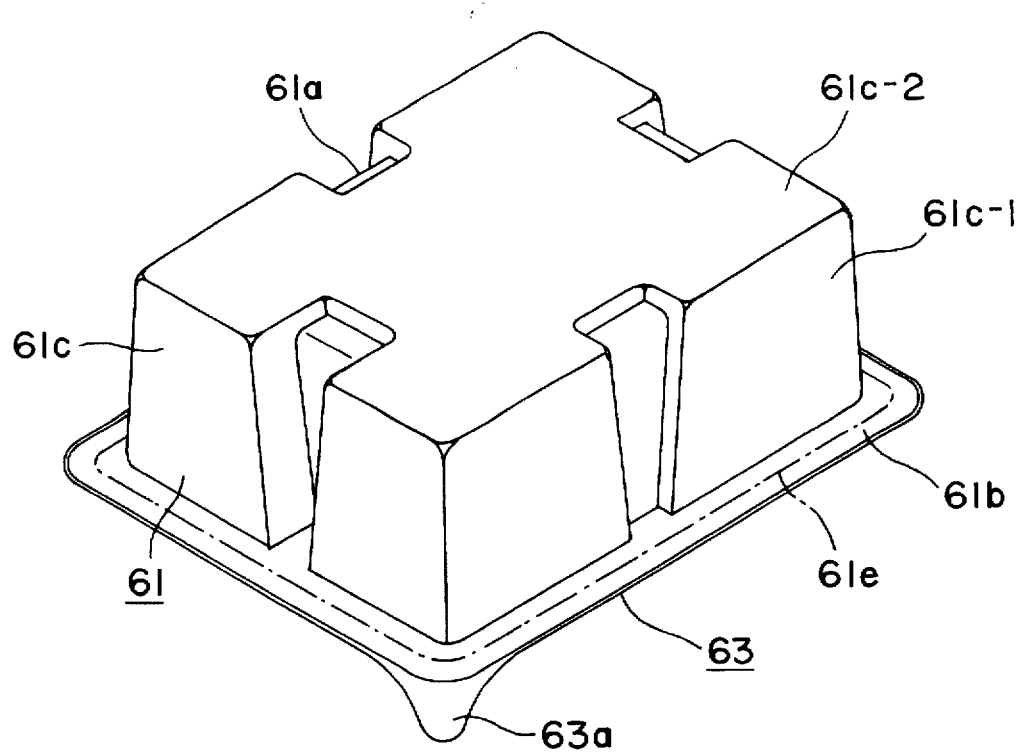
FIG. 14 is a perspective view showing an assembly state of the storage container (packing container) of the ink-jet cartridge of the present invention.

In this arrangement, the structure is the same as that shown in FIGS. 1, 14, and 15 except for the shape of recess portions 61a of the container body 61. Each recess portion 61a of the container body 61 is formed not reaching a flange portion 61b. An inclined surface having a predetermined inclination angle is formed in each recess portion 61a to support the ink-jet cartridge. Fixing performance of the ink-jet cartridge within the storage space in the container described previously is better than that of this container. However, the object of the present invention can be substantially achieved by this container.

(Recording Head: Example 1)

A 1-mm thick polypropylene sheet was used to mold a container body (FIG. 1) by male mold vacuum molding by extending a material portion except for a ceiling portion 61c-1 toward the bottom portion. The sizes of the respective portions are as follows:

Minimum wall thickness: 0.2 mm

Radius of curvature of corner: 3 mm

A polypropylene layer (thickness: 30 µm), a polyethyleneterephthalate layer (thickness: 12 µm), an aluminum layer (thickness: 9 µm), and a polyethylene-based easy peel layer (thickness: 30 µm) were stacked from the surface side adhered to the container body in the order named, thereby forming the lid member 3.

An ink-jet cartridge IJC having an ink tank for storing an ink, a polyethyleneterephthalate protective tape (with the adhesive layer described above), formed as the cover member 3 on the injection port surfaces, for sealing the injection ports, and a cap member with the ink absorption member 6 as the press member 4 for urging the protective tape was stored in the container body 61. The bottom surface of the container body was matched with the lid member 63 to weld the flange portion 61b and the lid member 63 by an ultrasonic welder.

The obtained package sample, and a set of samples were dropped from a predetermined height to check protection states of the packed ink-jet cartridges. No damage or the like occurred in the ink-jet cartridges.

The resultant package samples were left still under a predetermined atmosphere for a predetermined period of time, and the amounts of water content evaporated from inks filled in the ink-jet cartridges were tested by measuring the weights of the ink-jet cartridges. Decreases in weights of the ink-jet cartridges were small.

No deformation such as curling of the lid member with a lapse of a predetermined period of time was observed.

(Recording Head: Example 2)

A container body was manufactured following the same procedures as in Example 1 of the recording head except that a vinyl chloride sheet coated with a 30-µm thick vinylidene chloride film was used, and an ink-jet cartridge was packed.

The dropping test of the resultant package samples was performed following the same procedures as in Example 1 of the recording head, and no defects such as damage of the packed ink-jet cartridges occurred.

An evaporation amount of moisture of an ink filled in each packed ink-jet cartridge was measured following the same procedures as in Example 1 of the recording head. The evaporation amount is very small as in Example 1 of the recording head, and no deformation such as curling of the lid member was observed.

(Recording Head: Example 3)

A container body was manufactured following the same procedures as in Example 1 of the recording head except that a radius R of curvature of each curved portion was set to be 1 mm, an ink-jet cartridge was packed, and a dropping test and a measurement of an evaporation amount of moisture were conducted.

The minimum thickness of the wall of the resultant container body sample was 0.05 mm.

Although small recesses were formed in the container bodies of the package samples in the dropping test, no defects were found in the packed ink-jet cartridges.

The evaporation amount of the water content of the ink filled in each ink-jet cartridge was small, and no deformation of the lid member was found.

(Recording Head: Example 4)

A container body was manufactured following the same procedures as in Example 1 of the recording head except that a material portion (recess portions 61a and the wall portion 61c) was extended in vacuum from a portion serving as the flange portion 61b by female molding, a radius of curvature of a corner portion of the flange portion 61b was set to be 0.5 mm, and a radius of curvature of other corner portions was set to be 2 mm. An ink-jet cartridge was packed following the same procedures as in Example 1 of the recording head.

A dropping test of the resultant package samples and measurement of the evaporation amount of the water content of the ink were performed as in Example 1, and no defects were found.

In the dropping test, no defects were found in the packed ink-jet cartridges.

Good recording could be performed in the use state of the recording head, and no recording errors caused by a residual adhesive layer occurred. The evaporation amount of the water content of the ink was small, and no deformation of the lid member was found.

Figure 19A:
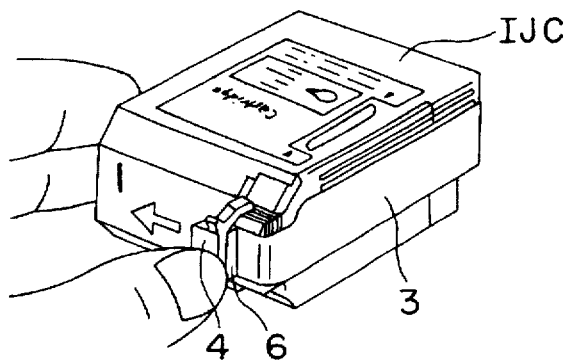
FIGS. 19A to 19C are views for explaining an operation of the present invention when a recording head having an arrangement of the present invention is set in a user state.
Figure 19B:
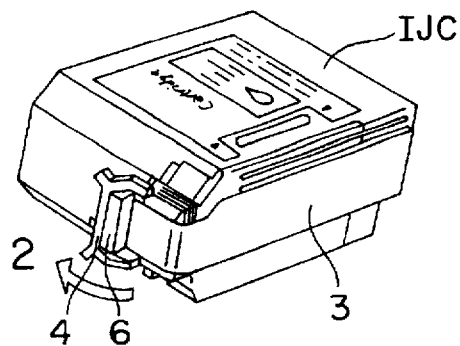
Figure 19C:
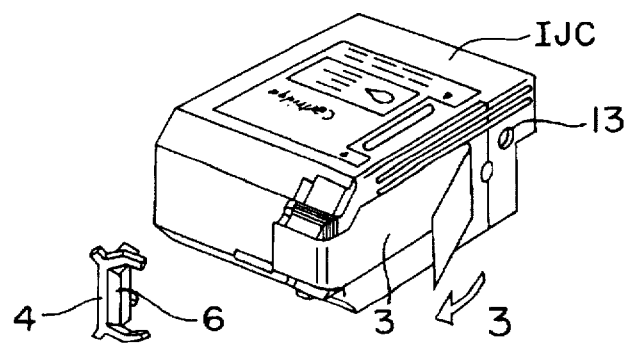

FIGS. 19A to 19C are views for explaining operations of the present invention when a recording head having the arrangement of the present invention is used.

As shown in FIGS. 19A and 19B, the user moves the press member 4 from the head portion in directions of arrows 1 and 2 to remove the press member from the injection port surfaces, thereby to causing the press member 4 to release the absorbing member 6 urged against the injection port surface of the head. When a force acting from the absorbing member 6 is released, an external force acting on the cover member, i.e., the adhesive layer coated on the seal sheet 3 is also eliminated.

In this state, the seal sheet 3 shown in FIG. 19C is peeled from the outer surface of the ink-jet cartridge IJC from a side away from the injection ports, i.e., the outer air communication port 13. The seal sheet 3 is peeled in a direction of an arrow 3 to release sealing of the outer air communication port 13 first. Outer air enters from the outer air communication port 13 to the cartridge IJC. Thereafter, the seal sheet 3 is further peeled and the injection port surfaces are finally exposed. At the same time, the press member 4 and the absorption member 6 are removed from the ink-jet cartridge IJC.

The following effect is obtained by peeling the seal sheet 3 by the above operation procedures described above. By releasing the pressure acting on the seal sheet 3, the disturbance of the adhesive layer applied to the seal sheet 3 can be eliminated. When the seal sheet 3 is peeled from the injection port surfaces, the adhesive agent is not left, and ink injection is not adversely affected. Since the outer air communication port 13 is opened first, outer air enters from the outer air communication port 13 to the cartridge IJC. The outer air enters to the cartridge IJC to some extent and the injection ports are exposed to the outer air after the interior is stabilized. Therefore, the outer air will not enter from the injection ports of the head.

Of all ink-jet recording schemes, the present invention provides excellent effects in a bubble-jet recording head and a bubble-head recording apparatus.

The typical arrangement and principle are preferably based on basic principles disclosed in U.S. Pat. Nos. 4,723,129 and 4,740,796. This scheme can be applied to a so-called on-demand scheme or a so-called continuous scheme. In particular, when the on-demand scheme is employed, at least one drive signal for causing quick temperature rise exceeding nuclear boiling corresponding to recording information is applied to electrothermal conversion elements located in correspondence with a sheet which stores a liquid (ink) or liquid paths. Heat energy is generated by the electrothermal conversion elements to cause film boiling on the heat generation surface of the recording head, thereby effectively forming a bubble in the liquid (ink) in one-to-one correspondence with the drive signal. Growth and contraction of this bubble cause injection of the liquid from each injection opening, thereby forming at least one droplet. When a drive signal is given in the form of pulses, the bubble instantaneously grows and contracts to achieve liquid (ink) injection having a high response speed. As a pulse drive signal, signals described in U.S. Pat. Nos. 4,463,359 and 4,345,262 can be suitably used. When conditions described in U.S. Pat. No. 4,313,124 concerning a temperature rise rate of the heat generation surface are employed, better recording can be performed.

U.S. Pat. No. 4,558,333 disclosing an arrangement in which a heat generation portion is located at a bent region and an arrangement described in U.S. Pat. No. 4,459,600 are also incorporated as the arrangements of the recording heads in addition to the arrangement (liner liquid path or orthogonal liquid path) as a combination of the injection ports, the liquid paths, and the electrothermal conversion elements disclosed in each prior-art patent described above. In addition, the present invention is also effective to arrangements based on Japanese Patent Laid-Open No. 59-123670 disclosing an arrangement in which a slit common to a plurality of electrothermal conversion elements serves as an injection port unit for the elements and Japanese Patent Laid-Open No. 59-138461 disclosing an arrangement in which an opening for absorbing a heat energy pressure wave is formed in correspondence with an injection port unit.

In addition, as a full-line type recording head having a length corresponding to the width of a maximum recording medium used in a recording apparatus, a plurality of recording heads disclosed in the above prior-art inventions may be combined to obtain a length satisfying the above length, or a single recording head may be used to obtain the above length. In either case, the present invention can effectively enhance the effect described above.

In addition, an exchangeable chip type recording head capable of performing electrical connections with the apparatus main body and supplying an ink from an apparatus main body, or a cartridge type recording head integrally formed with the recording head itself may be effectively used in the present invention.

A recovery means for the recording head or a supplementary auxiliary means may be added as mechanisms in the recording apparatus of the present invention to further enhance the effects of the present invention. Detailed examples of these means are a capping means, a cleaning means, a pressurizing or absorbing means, an electrothermal conversion element, a heating element independently from the electrothermal conversion element, a preheating means as a combination of these elements, and a pre-injection mode for performing injection independently of recording for the recording head are effective to perform stable recording.

As recording modes of a recording apparatus, in addition to a recording mode of a main color such as black, a plurality of recording heads for color components may be integrally formed to perform color recording. However, the present invention is also applicable to a recording apparatus having a recording head operated for color recording using a plurality of different colors or color mixing.

By using the packing container described above, the ink-jet cartridge itself and the seal state can be properly and inexpensively protected from the impacts caused by vibrations and dropping during transportation.

The packing container according to the present invention is located in accordance with the shape of the ink-jet cartridge and supports the content with an appropriate gap. The packing container has recess portions which prevent direct contact between the wall portion of the packing container body and the ink-jet cartridge. Positioning and fixing of the ink-jet carriage within the packing container can be effectively performed. An external impact acting on the wall portion of the container body is not transmitted to the content.

In packing using the packing container according to the present invention, an increase in packing space is small, energy saving can be achieved, and warehouse and storage spaces and costs can be saved.

In addition, in the packing container according to the present invention, the humidity atmosphere maintaining function in the packed state of the ink-jet cartridge can be achieved. Packing which can protect the ink-jet cartridge and can assure the humidity atmosphere maintaining property can be performed.

Since the cover member having the adhesive layer of the present invention to cover the injection ports is formed on the injection port surface of the ink-jet cartridge, evaporation of the ink from the injection ports can be minimized. The humidity of the storage space can be optimized, and the curling of the lid member can be prevented. Therefore, a state of an ink supply path from the ink tank to the injection port can be optimized.

Furthermore, according to the present invention, the press member for pressing the cover member against the ink-jet cartridge is arranged to prevent the user's hand from entering into the injection ports upon removal of the ink-jet cartridge from the storage container, thereby enhancing convenience in view of protection of the injection port unit.

According to the present invention, as described above, a good recovery state upon peeling of the seal in various articles can be obtained by the adhesive seal. In particular, the outer air communication port and the injection ports are sealed by the single seal member to cause the press member to properly seal the injection port unit. Therefore, new problems posed by the ink-jet recording head can be solved.

We claim:

1. A sealing mechanism of an ink-jet recording head, said recording head provided with an ink discharging opening portion which communicates with a storage portion for storing an ink and is open to outer air, said sealing mechanism comprising a supporting member provided with an adhesive abutting against said opening portion through said adhesive so as to seal said opening portion, wherein said adhesive consists essentially of an acrylate copolymer obtained by crosslinking an acrylic copolymer with isocyanate, and said acrylic copolymer being obtained by using at least 80 wt % of a total, content of an alkyl acrylate having an OH group and/or an alkoxy alkyl acrylate having an OH group, and an acrylate having a side chain of an alkyl or alkoxy alkyl group having 4 to 9 carbon atoms, wherein said acrylate copolymer is substantially free of any polymer or a residual monomer having a molecular weight of 10,000 or less.

2. A sealing mechanism of an ink-storage member for an ink-jet recording head, said ink storage member provided with an opening portion which communicates with a storage unit for storing an ink and is open to outer air, said sealing mechanism comprising a supporting member provided with an adhesive abutting against said opening portion through said adhesive so as to seal said opening portion, wherein said adhesive consists essentially of an acrylate copolymer obtained by crosslinking an acrylic copolymer with isocyanate, and said acrylic copolymer being obtained by using at least 80 wt % of a total content of an alkyl acrylate having an OH group and/or an alkoxy alkyl acrylate having an OH group, and an acrylate having a side chain of an alkyl or alkoxy group having 4 to 9 carbon atoms, wherein said acrylate copolymer is substantially free of any polymer or a residual monomer having a molecular weight of 10,000 or less.

3. A sealing mechanism of an ink-jet recording head integrally provided with an ink tank, said recording head having an ink discharging opening portion which communicates with said ink tank for storing an ink and is open to outer air, said sealing mechanism comprising a head protecting member which includes an adhesive layer united with an elastic member for urging said adhesive layer against said opening portion, said elastic member united with an engaging portion for integrally engaging the head protecting member with the recording head, wherein said adhesive layer consists essentially of an acrylate copolymer obtained by crosslinking an acrylic copolymer with isocyanate, and said acrylic copolymer being obtained by using at least 80 wt % of a total content of an alkyl acrylate having an OH group and/or an alkoxy alkyl acrylate having an OH group, and an acrylate having a side chain of an alkyl or alkoxy alkyl group having 4 or 9 carbon atoms, wherein said acrylate copolymer is substantially free of any polymer or a residual monomer having a molecular weight of 10,000 or less.

4. A sealing mechanism according to claim 3, wherein said sealing mechanism also seals an atmosphere communication port of said ink tank.

* * * * *

UNITED STATES PATENT AND TRADEMARK OFFICE
CERTIFICATE OF CORRECTION

PATENT NO. : 5,781,208

DATED : July 14, 1998

INVENTOR(S): SEIICHIRO KARITA, ET AL.

Page 1 of 3

It is certified that error appears in the above-identified patent and that said Letters Patent is hereby corrected as shown below:

ON THE COVER PAGE:

Item [54] TITLE

"AND" should read --AN--.

Item [56] FOREIGN PATENT DOCUMENTS

```
 "64185    1/1989    Japan" should read
--64-185   1/1989    Japan--.
```

Item [57] ABSTRACT

Line 6, "a OH group" should read --an OH group--.

IN THE DISCLOSURE:

COLUMN 1:

Line 1, "AND" should read --AN--.

COLUMN 3:

Line 56, "use" should read --used--.

COLUMN 4:

Line 35, "with-the" should read --with the--.

UNITED STATES PATENT AND TRADEMARK OFFICE
CERTIFICATE OF CORRECTION

PATENT NO. : 5,781,208

DATED : July 14, 1998

INVENTOR(S) : SEIICHIRO KARITA, ET AL.

It is certified that error appears in the above-identified patent and that said Letters Patent is hereby corrected as shown below:

COLUMN 5:

Line 28, "Of" should read --of--.

COLUMN 6:

Line 17, "perfluoroalkylv inylether" should read --perfluoroalkylvinylether--.

COLUMN 10:

Line 32, "test" should read --tests--.

COLUMN 13:

Line 14, "incorporate" should read --incorporates--.
　　　Line 35, "obtained" should read --obtain--.

COLUMN 14:

Line 51, "$P_o$." should read --$P_o$--.

COLUMN 15:

Line 40, "opening 11 to opening 11)" should read --opening 141 to opening 111)--.

UNITED STATES PATENT AND TRADEMARK OFFICE
CERTIFICATE OF CORRECTION

PATENT NO. : 5,781,208
DATED : July 14, 1998
INVENTOR(S): SEIICHIRO KARITA, ET AL.

It is certified that error appears in the above-identified patent and that said Letters Patent is hereby corrected as shown below:

COLUMN 18:

Line 43, "time.," should read --time,--.

COLUMN 23:

Line 45, "$\hat{1}$" should read --①--.
    Line 46, "$\hat{2}$" should read --②--.
    Line 47, "to" should be deleted.
    Line 57, "$\hat{3}$" should read --③--.

COLUMN 24:

Line 6, "to" (first occurrence) should be deleted.

COLUMN 26:

Line 12, "total," should read --total--.

Signed and Sealed this

Nineteenth Day of October, 1999

Attest:

Q. TODD DICKINSON

*Attesting Officer*      *Acting Commissioner of Patents and Trademarks*